(12) United States Patent
Hua et al.

(10) Patent No.: US 10,785,639 B2
(45) Date of Patent: Sep. 22, 2020

(54) GROUP COMMUNICATION METHOD AND SYSTEM, AND DEVICE

(71) Applicant: HUAWEI TECHNOLOGIES CO., LTD., Shenzhen, Guangdong (CN)

(72) Inventors: Yao Hua, Shenzhen (CN); Yan Wang, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/147,167

(22) Filed: Sep. 28, 2018

(65) Prior Publication Data

US 2019/0037387 A1  Jan. 31, 2019

Related U.S. Application Data

(63) Continuation of application No. PCT/CN2016/078356, filed on Apr. 1, 2016.

(51) Int. Cl.
| | |
|---|---|
| *H04W 88/02* | (2009.01) |
| *H04W 8/18* | (2009.01) |
| *H04W 40/02* | (2009.01) |
| *H04W 72/04* | (2009.01) |
| *H04W 88/08* | (2009.01) |

(52) U.S. Cl.
CPC .......... *H04W 8/186* (2013.01); *H04W 40/02* (2013.01); *H04W 72/04* (2013.01); *H04W 88/02* (2013.01); *H04W 88/08* (2013.01)

(58) Field of Classification Search
CPC ....... H04W 8/18; H04W 72/04; H04W 8/186; H04W 88/02
See application file for complete search history.

(56) References Cited

U.S. PATENT DOCUMENTS

| | | | | |
|---|---|---|---|---|
| 2004/0151133 A1* | 8/2004 | Yi | ........................ | H04W 99/00 370/312 |
| 2005/0076369 A1 | 4/2005 | Cai et al. | | |
| 2005/0083913 A1* | 4/2005 | Choi | ..................... | H04W 76/40 370/352 |

(Continued)

FOREIGN PATENT DOCUMENTS

| | | |
|---|---|---|
| CN | 1981464 A | 6/2007 |
| CN | 105163285 A | 12/2015 |

(Continued)

*Primary Examiner* — Chi Ho A Lee
*Assistant Examiner* — Andrew Lee
(74) *Attorney, Agent, or Firm* — Womble Bond Dickinson (US) LLP

(57) ABSTRACT

Embodiments of the present disclosure provide a group communication method, a device, and a group communication system, and relate to the communications field, so as to accurately identify a cell range in which group communication data is to be broadcast and to improve utilization of a downlink transmission resource. The group communication method may include obtaining, by a server, a first group identifier, where the first group identifier is determined based on location information of first user equipment. The method may also include obtaining, by the server, group communication data sent by the first user equipment. Furthermore, the method may include sending, by the server, the group communication data in a cell corresponding to the first group identifier based on the first group identifier.

6 Claims, 19 Drawing Sheets

(56) References Cited

U.S. PATENT DOCUMENTS

| | | |
|---|---|---|
| 2006/0025125 A1 | 2/2006 | Hong et al. |
| 2007/0223491 A1 | 9/2007 | Baek et al. |
| 2007/0253365 A1 | 11/2007 | Hedberg et al. |
| 2009/0305712 A1* | 12/2009 | Franceschini ......... H04W 52/08 455/450 |
| 2011/0223943 A1 | 9/2011 | Fischer |
| 2011/0239216 A1* | 9/2011 | Miyajima ............... G06F 9/455 718/1 |
| 2012/0039233 A1* | 2/2012 | Kim .................... H04W 72/005 370/312 |
| 2014/0036792 A1* | 2/2014 | Li .......................... H04L 45/28 370/329 |
| 2014/0254456 A1* | 9/2014 | Roh ..................... H04L 12/189 370/312 |
| 2015/0111574 A1* | 4/2015 | Fukumasa ............... H04W 4/06 455/435.1 |
| 2015/0156658 A1* | 6/2015 | Zhang .................... H04W 4/06 370/252 |
| 2017/0295567 A1* | 10/2017 | Chen .................. H04W 72/048 |
| 2018/0124190 A1* | 5/2018 | Ji ............................ H04L 67/10 |
| 2018/0146362 A1 | 5/2018 | Hou et al. |
| 2018/0167790 A1* | 6/2018 | Cavalcanti ............. H04L 67/12 |
| 2018/0263052 A1* | 9/2018 | Xu ........................ H04W 72/04 |
| 2018/0279405 A1* | 9/2018 | Kim ...................... H04W 24/10 |
| 2018/0317066 A1* | 11/2018 | Xu .......................... H04W 4/06 |

FOREIGN PATENT DOCUMENTS

| | | |
|---|---|---|
| CN | 105246119 A | 1/2016 |
| CN | 105280005 A | 1/2016 |
| EP | 2905911 A1 | 8/2015 |
| EP | 2955973 A1 | 12/2015 |
| EP | 2981108 A1 | 2/2016 |
| WO | 2015154653 A1 | 10/2015 |

\* cited by examiner

GROUP COMMUNICATION METHOD AND SYSTEM, AND DEVICE

CROSS-REFERENCE TO RELATED APPLICATIONS

This application is a continuation of International Application No. PCT/CN2016/078356, filed on Apr. 1, 2016, the disclosure of which is hereby incorporated by reference in its entirety.

TECHNICAL FIELD

The present application relates to the communications field, and in particular, to a group communication method and system, and a device.

BACKGROUND

As a new type of vehicle communications network, the Internet of Vehicles can implement wireless communication between vehicles and between a vehicle and a roadside infrastructure. In the Internet of Vehicles, it is assumed that a valid transmission distance of group communication data that a vehicle A needs to send is less than or equal to 320 meters, and the vehicle A may send the group communication data to a server by using a Long Term Evolution (LTE) network. The server sends the group communication data in a broadcast or multicast manner, so that a vehicle B that is less than or equal to 320 meters away from the vehicle A can receive the group communication data.

To ensure that all vehicles on a road can receive corresponding group communication data, the prior art provides a group communication solution, which is specifically as follows: Cells served by a base station around the road are divided into several cell groups. When the vehicle A enters a cell group, the vehicle A automatically joins the cell group. After the vehicle A sends the group communication data to the server, the server broadcasts the group communication data in all cells included in the cell group. In this way, it can be ensured that a vehicle in a current serving cell of the vehicle A and vehicles in all neighboring cells of the vehicle A can receive the group communication data. In addition, the group communication data is not spread to a relatively remote cell.

However, in actual application, a coverage area of a cell may be greater than or less than 320 meters. If a coverage area of a cell is far greater than 320 meters, the server may need to broadcast the group communication data only in a current serving cell of the vehicle A or the current serving cell of the vehicle A and some neighboring cells of the vehicle A. In the existing solution, the server broadcasts the group communication data in the current serving cell of the vehicle A and all neighboring cells of the vehicle A, which causes a waste of a downlink transmission resource. If a coverage area of a cell is far less than 320 meters, the server may further need to broadcast the group communication data in another cell in addition to a current serving cell of the vehicle A and all neighboring cells of the vehicle A. In the existing solution, user equipment in another cell other than the current serving cell of the vehicle A and all the neighboring cells of the vehicle A cannot receive the group communication data, that is, the group communication data is not effectively transmitted, and an actual transmission requirement cannot be met.

SUMMARY

Embodiments of the present invention provide a group communication method and system, and a device, to accurately identify a cell range in which group communication data is to be broadcast and to improve utilization of a downlink transmission resource.

To achieve the foregoing objective, the following technical solutions are used in the embodiments of the present invention:

An embodiment of the present invention provides a group communication method: A server first obtains a first group identifier determined based on location information of first user equipment, and obtains group communication data sent by the first user equipment. Then, the server sends the group communication data in a cell corresponding to the first group identifier based on the first group identifier.

Because the first group identifier in this embodiment of the present invention is determined based on the location information of the first user equipment, the group communication method provided in the present invention can be used to accurately identify a cell range in which the group communication data sent by the first user equipment is to be broadcast, and to improve utilization of a downlink transmission resource.

Optionally, if the server is an application server, a method for obtaining the first group identifier by the server is as follows: The application server obtains, based on the received location information, the first group identifier corresponding to the location information from a preset correspondence. The location information is the location information sent by the first user equipment, and the first preset correspondence stores a correspondence between the location information and the first group identifier.

Optionally, if the server is an application server, a method for obtaining the first group identifier by the server is as follows: The application server receives the first group identifier sent by the first user equipment.

It may be learned that, if the server is an application server, the method for obtaining the first group identifier by the application server is not unique.

Further, if the server is an application server, the application server sends the group communication data to a broadcast server in a first broadcast session, so that the broadcast server sends the group communication data in the cell. The first broadcast session is a broadcast session, corresponding to the first group identifier, established between the application server and the broadcast server.

Optionally, if the server is a broadcast server, a method for obtaining the first group identifier by the server is as follows: The broadcast server receives the first group identifier sent by an application server, or the broadcast server receives the first group identifier sent by a base station. The base station is a serving base station of the first user equipment.

It may be learned that, if the server is a broadcast server, the method for obtaining the first group identifier by the broadcast server is not unique.

Further, if the server is a broadcast server, the broadcast server further receives a service identifier sent by the application server. The service identifier is used to indicate a service type of the group communication data.

Because the service identifier is used to indicate the service type of the group communication data, the broadcast server may learn of, based on the service identifier, a type of a group communication service that the application server intends to perform with the broadcast server.

According to a second aspect, an embodiment of the present invention provides a group communication method: User equipment obtains first information, where the first information is determined based on location information of the first user equipment, and the first information is area information of the user equipment or a first group identifier. Then, the user equipment sends the area information of the user equipment or the first group identifier.

After obtaining the area information of the user equipment or the first group identifier determined based on the location information of the user equipment, the user equipment sends the area information of the user equipment or the first group identifier determined based on the location information of the user equipment, so that another communications device in a group communication network system determines the first group identifier based on the area information of the user equipment, or another communications device in a group communication network system directly receives the first group identifier sent by the user equipment, so that the another communications device sends group communication data in a cell corresponding to the first group identifier. Because the area information of the user equipment or the first group identifier is determined based on the location information of the first user equipment, the group communication method provided in the present invention can be used to accurately identify a cell range in which group communication data sent by the first user equipment is to be broadcast, and to improve utilization of a downlink transmission resource.

Optionally, if the first information is the first group identifier, a method for obtaining the first information by the user equipment is as follows: The user equipment receives the first group identifier sent by a base station. The base station serves the user equipment.

Optionally, if the first information is the first group identifier, a method for obtaining the first information by the user equipment is as follows: The user equipment receives a preset correspondence sent by a base station; the user equipment obtains the location information of the user equipment; the user equipment obtains, based on the location information, the first group identifier corresponding to the location information from the preset correspondence. The preset correspondence stores a correspondence between the location information and the first group identifier.

It may be learned that, in this embodiment of the present invention, a manner in which the user equipment obtains the first information is not unique.

Further, if the first information is the first group identifier, the user equipment sends the first group identifier to an application server.

Optionally, if the first information is the area information of the user equipment, a method for obtaining the first information by the user equipment is as follows: First, the user equipment receives at least one piece of area information sent by a base station, where the base station is a serving base station of the user equipment, and the at least one piece of area information includes an area covered by the base station; then, the user equipment obtains geographical location information of the user equipment; finally, the user equipment uses, based on the geographical location information, area information to which the geographical location information belongs in the at least one piece of area information, as the area information of the user equipment.

Further, if the first information is the area information of the user equipment, the user equipment sends the area information of the user equipment to the base station.

Further, in the group communication method provided in this embodiment of the present invention, the user equipment further receives configuration information sent by the base station. The configuration information is used to indicate a rule used by the user equipment to send the area information of the user equipment to the base station.

According to a third aspect, an embodiment of the present invention provides a group communication method: A base station receives location information sent by first user equipment, and determines a first group identifier based on the location information, and then the base station sends the first group identifier.

Because the first group identifier in this embodiment of the present invention is determined based on the location information of the first user equipment, the group communication method provided in the present invention can be used to accurately identify a cell range in which group communication data sent by the first user equipment is to be broadcast, and to improve utilization of a downlink transmission resource.

A method for sending the first group identifier by the base station is as follows: The base station sends the first group identifier to the first user equipment, or the base station sends group identifier information to a broadcast server. The group identifier information includes the first group identifier and an identifier of the first user equipment.

Further, the group identifier information further includes a service identifier, and the service identifier is used to indicate a service type of group communication data sent by the first user equipment.

Because the service identifier is used to indicate the service type of the group communication data, the broadcast server may learn of, based on the service identifier, a type of a group communication service that the base station intends to perform with the broadcast server.

Optionally, if the location information is area information of the first user equipment, before the base station receives the location information sent by the first user equipment, the base station further sends configuration information to the first user equipment. The configuration information is used to indicate a rule used by the first user equipment to send the area information of the first user equipment to the base station.

According to a fourth aspect, an embodiment of the present invention provides a group communication method: An application server sends a group identifier request message to a broadcast server, where the group identifier request message carries a service identifier, and the service identifier is used to indicate a service type of group communication data. Correspondingly, the application server receives a group identifier response message sent by the broadcast server, where the group identifier response message carries at least one group identifier corresponding to the service identifier and at least one cell identity corresponding to each group identifier.

The group identifier request message sent by the application server to the broadcast server carries the service identifier. Therefore, the application server may obtain the at least one group identifier corresponding to the service identifier and the at least one cell identity corresponding to each group identifier as needed, without needing to obtain a group identifier of another service type. In this way, receiving energy consumption of the application server can be reduced, and a group identifier storage capacity of the application server is reduced.

Further, the application server in this embodiment of the present invention further obtains group communication data sent by first user equipment and a cell identity of a first cell to which the first user equipment belongs, and then the application server determines, based on the cell identity of the first cell, a first group identifier corresponding to the cell identity of the first cell from the at least one group identifier.

Further, if the group identifier response message further carries broadcast session configuration corresponding to the first group identifier, the application server sends the group communication data to the broadcast server in a first broadcast session. The first broadcast session is a broadcast session, corresponding to the first group identifier, established between the application server and the broadcast server.

It may be understood that if the group identifier response message further carries the broadcast session configuration corresponding to the first group identifier, it indicates that the broadcast server has established a broadcast session corresponding to the first group identifier. Therefore, the application server may directly send the group communication data to the broadcast server in the broadcast session corresponding to the first group identifier.

According to a fifth aspect, an embodiment of the present invention provides a group communication method: A broadcast server receives a group identifier request message sent by an application server, where the group identifier request message carries a service identifier, and the service identifier is used to indicate a service type of group communication data. Then, the broadcast server sends a group identifier response message to the application server according to the service identifier, where the group identifier response message carries at least one group identifier corresponding to the service identifier and at least one cell identity corresponding to each group identifier.

Further, if the group identifier response message further carries broadcast session configuration corresponding to a first group identifier, the broadcast server receives, in a first broadcast session, group communication data sent by the application server. The first broadcast session is a broadcast session, corresponding to the first group identifier, established between the application server and the broadcast server.

Corresponding to the foregoing embodiment, if the group identifier response message further carries the broadcast session configuration corresponding to the first group identifier, it indicates that the broadcast server has established a broadcast session corresponding to the first group identifier. Therefore, the application server directly sends the group communication data to the broadcast server in the broadcast session corresponding to the first group identifier, and correspondingly, the broadcast server receives, in the broadcast session, the group communication data sent by the application server.

Further, the broadcast server further sends a bearer request message and the group communication data to a base station. The bearer request message carries the first group identifier and the service identifier, and the base station is a base station that serves a cell corresponding to the first group identifier.

According to a sixth aspect, an embodiment of the present invention provides a group communication method: A base station receives a bearer request message sent by a broadcast server, where the bearer request message carries a first group identifier and a service identifier; and sends first signaling to user equipment served by the base station, where the first signaling carries the first group identifier and the service identifier, and the service identifier is corresponding to the first group identifier.

Further, the base station receives group communication data that is sent by the broadcast server and corresponding to both the service identifier and the first group identifier, and then the base station sends the group communication data to the user equipment served by the base station.

It is easy to understand that after receiving the group communication data corresponding to both the first group identifier and the service identifier, the base station sends the group communication data according to the first group identifier and the service identifier.

According to a seventh aspect, an embodiment of the present invention provides a group communication method: User equipment that belongs to a cell corresponding to a first group identifier receives first signaling sent by a base station. The first signaling includes the first group identifier and a service identifier, and the service identifier is corresponding to the first group identifier.

The user equipment receives the first signaling sent by the base station; the user equipment determines whether the user equipment has obtained configuration corresponding to both the first group identifier and the service identifier; if the user equipment has obtained the configuration corresponding to both the first group identifier and the service identifier, the user equipment receives group communication data sent by the base station and corresponding to both the first group identifier and the service identifier; if the user equipment does not obtain the configuration corresponding to both the first group identifier and the service identifier, the user equipment sends a configuration request message to an application server corresponding to both the first group identifier and the service identifier, so as to obtain broadcast session configuration corresponding to both the service identifier and the first group identifier. The configuration request message carries at least one of the first group identifier and the service identifier.

It may be learned that after obtaining the broadcast session configuration corresponding to both the first group identifier and the service identifier, the user equipment receives the group communication data sent by the base station and corresponding to both the service identifier and the first group identifier. Therefore, the user equipment in the group communication method provided in this embodiment of the present invention does not receive group communication data of another service type, so that receiving energy consumption of the user equipment can be reduced.

According to an eighth aspect, an embodiment of the present invention provides a server, including a processing unit and a sending unit.

A function implemented by each unit module provided in this embodiment of the present invention is as follows:

The processing unit is configured to obtain a first group identifier, where the first group identifier is determined based on location information of first user equipment, and configured to obtain group communication data sent by the first user equipment; and the sending unit is configured to send group communication data in a cell corresponding to the first group identifier based on the first group identifier obtained by the processing unit.

For a technical effect of the server provided in this embodiment of the present invention, refer to a technical effect of the server described in the group communication method performed by the server in the first aspect, and details are not described herein again.

Optionally, if the server is an application server, the server further includes a receiving unit.

The receiving unit is configured to receive the location information sent by first user equipment, or configured to receive the first group identifier sent by first user equipment.

Further, the processing unit is configured to obtain, based on the location information received by the receiving unit, the first group identifier corresponding to the location information from a preset correspondence. The first preset correspondence stores a correspondence between the location information and the first group identifier.

Further, the sending unit is configured to send the group communication data to a broadcast server in a first broadcast session, so that the broadcast server sends the group communication data in the cell. The first broadcast session is a broadcast session, corresponding to the first group identifier, established between the application server and the broadcast server.

Optionally, if the server is a broadcast server, the server further includes a receiving unit.

The receiving unit is configured to receive the first group identifier sent by an application server, or configured to receive the first group identifier sent by a base station, where the base station is a serving base station of the first user equipment.

Further, the receiving unit is further configured to receive a service identifier sent by the application server, where the service identifier is used to indicate a service type of the group communication data.

According to a ninth aspect, an embodiment of the present invention provides user equipment, including a processing unit and a sending unit.

A function implemented by each unit module provided in this embodiment of the present invention is as follows:

The processing unit is configured to obtain first information, where the first information is area information of the user equipment or a first group identifier, and the first information is determined based on location information of the first user equipment.

The sending unit is configured to send the first information obtained by the processing unit.

For a technical effect of the user equipment provided in this embodiment of the present invention, refer to a technical effect of the first user equipment described in the group communication method performed by the first user equipment in the foregoing embodiment. Details are not described herein again.

Optionally, if the first information is the first group identifier, the user equipment further includes a receiving unit.

The receiving unit is configured to receive the first group identifier sent by a base station, where the base station serves the user equipment; or is configured to receive a preset correspondence sent by the base station.

Further, the processing unit is further configured to obtain the location information of the user equipment, and obtain, based on the location information, the first group identifier corresponding to the location information from the preset correspondence received by the receiving unit, where the preset correspondence stores a correspondence between the location information and the first group identifier.

Further, the sending unit is configured to send the first group identifier to an application server.

Optionally, if the first information is the area information of the user equipment, the user equipment further includes a receiving unit.

The receiving unit is configured to receive at least one piece of area information sent by a base station, where the base station is a serving base station of the user equipment, and the at least one piece of area information includes an area covered by the base station.

The processing unit is further configured to obtain geographical location information of the user equipment, and use, based on the geographical location information, area information to which the geographical location information belongs in the at least one piece of area information received by the receiving unit, as the area information of the user equipment.

Further, the sending unit is configured to send the area information of the user equipment to the base station.

Further, the receiving unit is further configured to receive configuration information sent by the base station, where the configuration information is used to indicate a rule used by the user equipment to send the area information of the user equipment to the base station.

According to a tenth aspect, an embodiment of the present invention provides a base station, including a receiving unit, a processing unit, and a sending unit.

A function implemented by each unit module provided in this embodiment of the present invention is as follows:

The receiving unit is configured to receive location information sent by first user equipment.

The processing unit is configured to determine a first group identifier based on the location information received by the receiving unit.

The sending unit is configured to send the first group identifier obtained by the processing unit.

For a technical effect of the base station provided in this embodiment of the present invention, refer to a technical effect of the base station described in the group communication method performed by the base station in the embodiment of the third aspect. Details are not described herein again.

Further, the sending unit is configured to send the first group identifier to the first user equipment, or configured to send group identifier information to a broadcast server. The group identifier information includes the first group identifier and an identifier of the first user equipment.

Further, the group identifier information further includes a service identifier, and the service identifier is used to indicate a service type of group communication data sent by the first user equipment.

Optionally, if the location information is area information of the first user equipment,
the sending unit is further configured to send configuration information to the first user equipment before the receiving unit receives the location information sent by the first user equipment, where the configuration information is used to indicate a rule used by the first user equipment to send the area information of the first user equipment to the base station.

According to an eleventh aspect, an embodiment of the present invention provides an application server, including a sending unit and a receiving unit.

A function implemented by each unit module provided in this embodiment of the present invention is as follows:

The sending unit is configured to send a group identifier request message to a broadcast server, where the group identifier request message carries a service identifier, and the service identifier is used to indicate a service type of group communication data.

The receiving unit is configured to receive a group identifier response message sent by the broadcast server, where the group identifier response message carries at least one group identifier corresponding to the service identifier and at least one cell identity corresponding to each group identifier.

For a technical effect of the application server provided in this embodiment of the present invention, refer to a technical effect of the application server described in the group communication method performed by the application server in the foregoing embodiment. Details are not described herein again.

Further, the application server further includes a processing unit.

The processing unit is configured to obtain group communication data sent by first user equipment and a cell identity of a first cell to which the first user equipment belongs, and determine, based on the cell identity of the first cell, a first group identifier corresponding to the cell identity of the first cell from the at least one group identifier received by the receiving unit.

Further, if the group identifier response message further carries broadcast session configuration corresponding to the first group identifier, the sending unit is configured to send the group communication data to the broadcast server in a first broadcast session. The first broadcast session is a broadcast session, corresponding to the first group identifier, established between the application server and the broadcast server.

According to a twelfth aspect, an embodiment of the present invention provides a broadcast server, including a sending unit and a receiving unit.

A function implemented by each unit module provided in this embodiment of the present invention is as follows:

The receiving unit is configured to receive a group identifier request message sent by an application server, where the group identifier request message carries a service identifier, and the service identifier is used to indicate a service type of group communication data.

The sending unit is configured to send a group identifier response message to the application server according to the service identifier received by the receiving unit, where the group identifier response message carries at least one group identifier corresponding to the service identifier and at least one cell identity corresponding to each group identifier.

For a technical effect of the broadcast server provided in this embodiment of the present invention, refer to a technical effect of the broadcast server described in the group communication method performed by the broadcast server in the foregoing embodiment. Details are not described herein again.

Further, if the group identifier response message further carries broadcast session configuration corresponding to a first group identifier, the receiving unit is configured to receive, in a first broadcast session, group communication data sent by the application server. The first broadcast session is a broadcast session, corresponding to the first group identifier, established between the application server and the broadcast server.

Further, the sending unit is further configured to send a bearer request message and the group communication data to a base station. The bearer request message carries the first group identifier and the service identifier, and the base station is a base station that serves a cell corresponding to the first group identifier.

According to a thirteenth aspect, an embodiment of the present invention provides a base station, including a sending unit and a receiving unit.

A function implemented by each unit module provided in this embodiment of the present invention is as follows:

The receiving unit is configured to receive a bearer request message sent by a broadcast server, where the bearer request message carries a first group identifier and a service identifier, and the service identifier is corresponding to the first group identifier.

The sending unit is configured to send the first group identifier and the service identifier to user equipment served by the base station.

For a technical effect of the base station provided in this embodiment of the present invention, refer to a technical effect of the base station described in the group communication method performed by the base station in the foregoing embodiment. Details are not described herein again.

Further, the receiving unit is further configured to receive group communication data that is sent by the broadcast server and corresponding to both the service identifier and the first group identifier.

Further, the sending unit is further configured to send the group communication data to the user equipment served by the base station.

According to a fourteenth aspect, an embodiment of the present invention provides user equipment, including a receiving unit.

A function implemented by each unit module provided in this embodiment of the present invention is as follows:

The receiving unit is configured to receive a first group identifier and a service identifier that are sent by a base station, where the service identifier is corresponding to the first group identifier.

, the receiving unit is configured to: if the user equipment has obtained configuration corresponding to both the first group identifier and the service identifier, receive group communication data that is sent by the base station and corresponding to both the first group identifier and the service identifier.

For a technical effect of the user equipment provided in this embodiment of the present invention, refer to a technical effect of the second user equipment described in the group communication method performed by the second user equipment in the foregoing embodiment. Details are not described herein again.

Further, the user equipment further includes a sending unit.

The sending unit is configured to: if the user equipment does not obtain the configuration corresponding to both the first group identifier and the service identifier, send a configuration request message to an application server corresponding to both the group identifier and the service identifier, so as to obtain the configuration corresponding to both the service identifier and the first group identifier. The configuration request message carries at least one of the first group identifier and the service identifier.

According to a fifteenth aspect, an embodiment of the present invention provides a server, including an interface circuit, a processor, a memory, and a system bus, where the interface circuit, the processor, and the memory are connected to the system bus, and when the server runs, the server performs the group communication method described in the foregoing embodiment.

The server in this embodiment of the present invention may be an application server, or may be a broadcast server.

For a technical effect of the server provided in this embodiment of the present invention, refer to a technical effect of the server described in the group communication method performed by the server in the foregoing embodiment, and details are not described herein again.

According to a sixteenth aspect, an embodiment of the present invention provides user equipment, including an interface circuit, a processor, a memory, and a system bus, where the interface circuit, the processor, and the memory are connected to the system bus, and when the user equipment runs, the user equipment performs the group communication method described in the foregoing embodiment.

For a technical effect of the user equipment provided in this embodiment of the present invention, refer to a technical effect of the user equipment described in the group communication method performed by the user equipment in the foregoing embodiment. Details are not described herein again.

According to a seventeenth aspect, an embodiment of the present invention provides a base station, including an interface circuit, a processor, a memory, and a system bus, where the interface circuit, the processor, and the memory are connected to the system bus, and when the base station runs, the base station performs the group communication method described in the foregoing embodiment.

For a technical effect of the base station provided in this embodiment of the present invention, refer to a technical effect of the base station described in the group communication method performed by the base station in the foregoing embodiment. Details are not described herein again.

According to an eighteenth aspect, an embodiment of the present invention provides a group communication system, including the server described in the foregoing embodiment, the user equipment described in the foregoing embodiment, and the base station described in the foregoing embodiment; or the application server described in the foregoing embodiment, the broadcast server described in the foregoing embodiment, the base station described in the foregoing embodiment, and the user equipment described in the foregoing embodiment.

In any one of the foregoing embodiments, the location information of the first user equipment is geographical location information of the first user equipment or area information of the first user equipment.

The area information of the first user equipment may be determined by the first user equipment according to an area division rule pre-agreed by each node in a network (for example, the pre-agreed area division rule is to divide longitudes and latitudes by using a fixed granularity), or may be determined by the first user equipment according to at least one piece of area information notified by another network device (for example, the base station or the application server sends area information of each area to the first user equipment, the area information is longitude and latitude information of a boundary point of the area or longitude and latitude information of a center point of the area, and a radius of the area).

Likewise, in any one of the foregoing embodiments, the first group identifier is a communication layer group identifier (for example, a temporary mobile group identity (TMGI) in an LTE system), or an application layer group identifier (for example, an application layer group identifier (Group ID)), or a cell identity of at least one cell corresponding to the first group identifier (for example, an E-UTRAN cell global identifier (ECGI) in an LTE system), or a broadcast session flow identifier corresponding to the first group identifier.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention.

DESCRIPTION OF EMBODIMENTS

Figure 1:
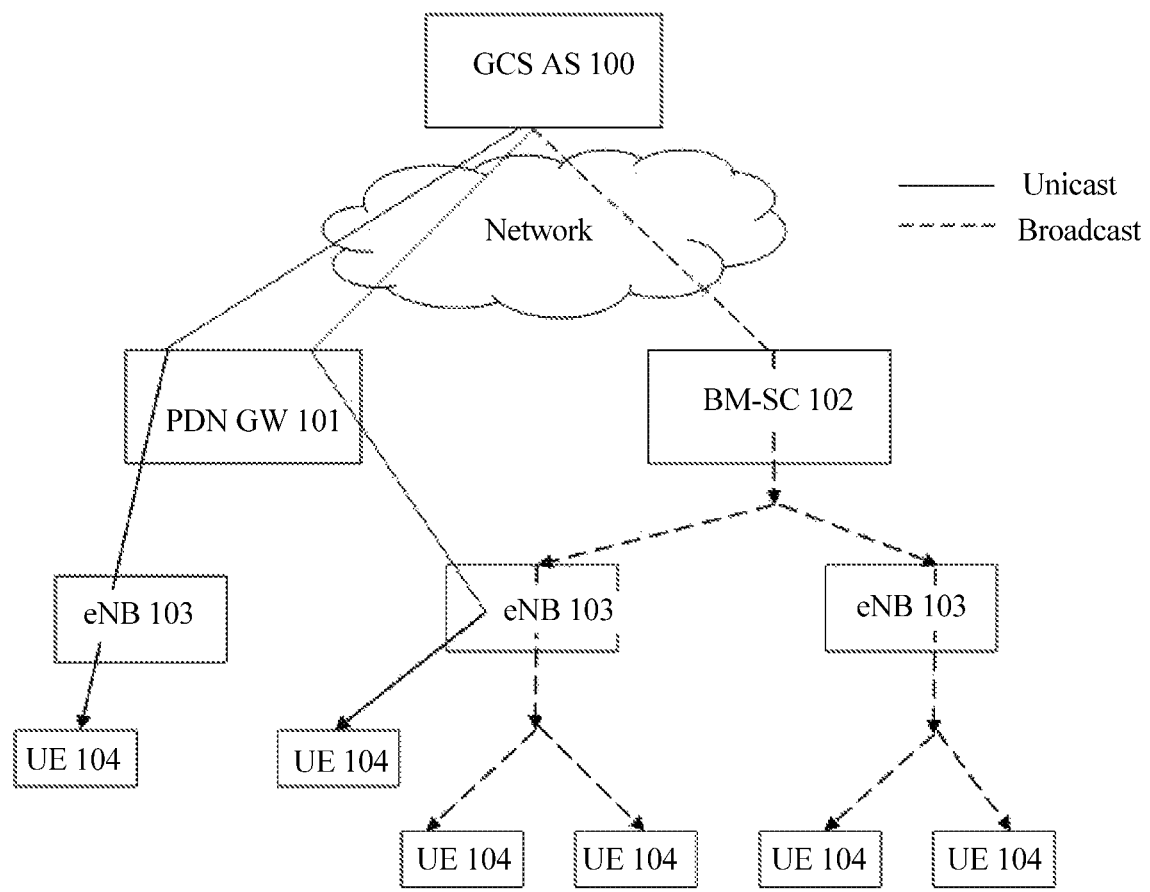
FIG. 1 is a structural diagram of a network of a group communication system in an LTE system architecture in the prior art.

The following describes the technical solutions in the embodiments of the present invention in detail with reference to the accompanying drawings in the embodiments of the present invention. Apparently, the described embodiments are merely some but not all of the embodiments of the present invention.

In the following description, specific details such as a particular system structure, an interface, and a technology are set forth in an illustrative but not a restrictive sense to make a thorough understanding of the present invention. However, a person skilled in the art should know that the present invention may be practiced in other embodiments without these specific details. In other cases, detailed descriptions of well-known mobile devices, circuits, and methods are omitted, so that the present invention is described without being obscured by unnecessary details.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that ordinal numbers such as "first" and "second", if mentioned in the embodiments of the present invention, are only used for distinguishing, unless the ordinal numbers definitely represent a sequence according to the context.

User equipment is a wireless terminal in embodiments discussed herein. The wireless terminal may refer to a device that provides a user with voice and/or data connectivity, a handheld device with a wireless connection function, or another processing device connected to a wireless modem. The wireless terminal may communicate with one or more core networks by using a radio access network (for example, radio access network (Radio Access Network, RAN)). The wireless terminal may be a mobile terminal, for example, a mobile phone (or also referred to as a "cellular" phone) or a computer that has a mobile terminal. The wireless terminal may be a portable, pocket-size, handheld, computer-integrated or in-vehicle mobile apparatus, which exchanges voice and/or data with the radio access network. The wireless terminal may also be referred to as a system, a subscriber unit, a subscriber station, a mobile station, a mobile console, a remote station, an access point, a remote terminal, an access terminal, a user terminal, a user agent, or user equipment.

Various technologies described in this specification may be used in various broadcast systems, such as a Global System for Mobile Communications (GSM), a Code Division Multiple Access (CDMA) 2000 system, Wideband Code Division Multiple Access (WCDMA), an LTE system, a mission-critical push-to-talk (MCPTT) system that is based on the LTE system and defined by the 3rd Generation Partnership Project (3GPP), a vehicle to vehicle (V2V) system, and another such communications system that are.

A group communication system enablers (GCSE) technology for LTE introduces an application layer function in 3GPP to support group communication. Each user equipment in LTE may belong to one cell group or a plurality of different cell groups.

FIG. 1 is a structural diagram of a network of a group communication system in an LTE system architecture according to embodiments discussed herein. Referring to FIG. 1, the network system includes a group communication service application server (GCS AS) 100, a packet data network gateway (PDN GW) 101, a broadcast/multicast service center (BM-SC) 102, an evolved NodeB (eNB) 103, and user equipment (UE) 104. The GCS AS 100 and the PDN GW 101 are connected by using a network, and the GCS AS 100 and the BM-SC 102 are connected by using a network interface (for example, an MB2 interface in the LTE system). The GCS AS 100 may perform service transmission by using an LTE unicast evolved packet system, or may use an existing MBMS network to broadcast a group communication service. In FIG. 1, a solid line indicates that the GCS AS 100 uses the LTE unicast evolved packet system to perform service transmission. A dashed line indicates that the GCS AS 100 uses the existing MBMS network to broadcast a group communication service.

Figure 2:
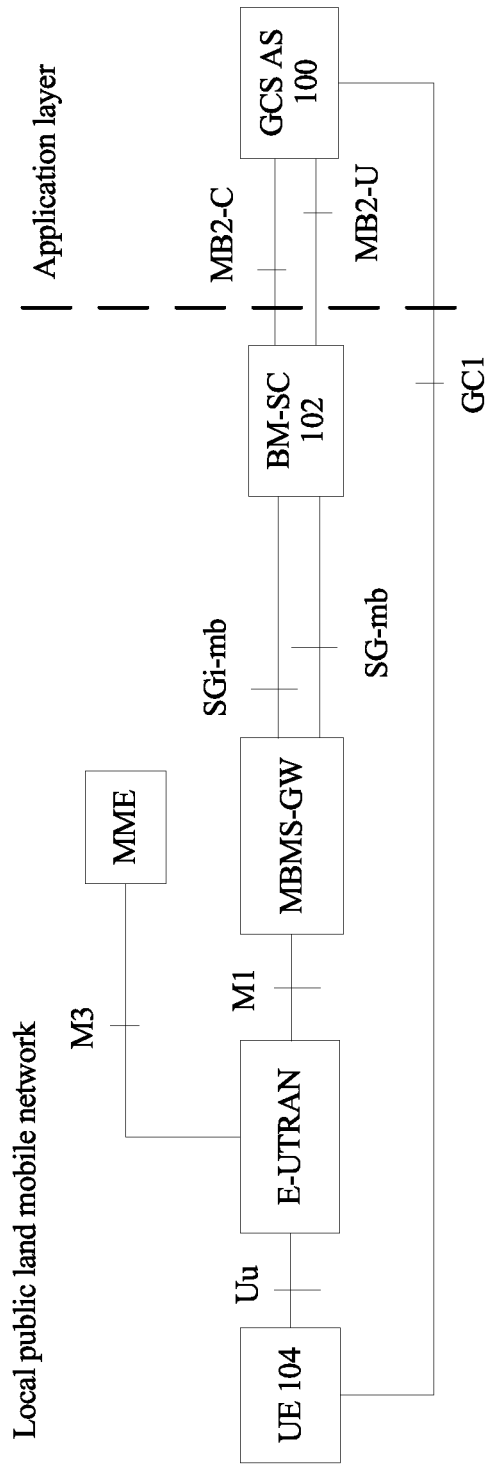
FIG. 2 is a schematic diagram of structural composition of a group communication system in an LTE system architecture in the prior art.

With reference to FIG. 1, FIG. 2 is a schematic diagram of structural composition of a group communication system in an LTE system architecture according to embodiments discussed herein. An evolved UMTS terrestrial radio access network (E-UTRAN) is a radio access network, and includes the eNB 103 that provides the UE 104 with an interface for accessing a wireless network. The BM-SC 102 provides service convergence and sending, user authorization, MBMS service bearer setup and initiation, session control initiation, and the like, may also implement synchronization between the BM-SC 102 and the eNB 103, and is responsible for processing a user data-related packet and session-related signaling. All of Uu, M1, M3, SGi, GC1, and MB2 indicate interfaces. The UE 104 establishes a connection to the GCS AS 100 through the GC1 interface on an application layer, and sends group communication data to the GCS AS 100 through the GC1 interface. Because the UE 104 joins one or more cell groups in advance, after receiving first information (there is a mapping relationship between the first information and a group identifier of a cell group to which the UE 104 belongs, for example, the first information may be a cell ID) and the group communication data that are sent by the UE 104, the GCS AS 100 may learn of, based on the first information, a cell group from which the group communication data received by the GCS AS 100 comes. The group identifier of the cell group may be a TMGI.

In the foregoing group communication system, in a downlink process, many broadcast sessions are pre-established between the GCS AS 100 and the BM-SC 102, and each broadcast session is corresponding to one TMGI and one broadcast session flow identifier. In this way, after receiving the first information and the group communication data, the GCS AS 100 automatically sends the group communication data in a first broadcast session. The first broadcast session is corresponding to a TMGI1, and the TMGI1 is corresponding to the first information.

In the Internet of Vehicles, a valid transmission distance of the group communication data is less than or equal to 320 meters. To ensure that all vehicles on a road can receive corresponding group communication data, a group communication solution is provided in prior systems and is specifically to divide cells served by a base station around the road into several cell groups. In this way, when a vehicle A enters a cell group, the vehicle A automatically joins the cell group. After the vehicle A sends group communication data to a server, the server broadcasts the group communication data in all cells included in the cell group.

Figure 3:
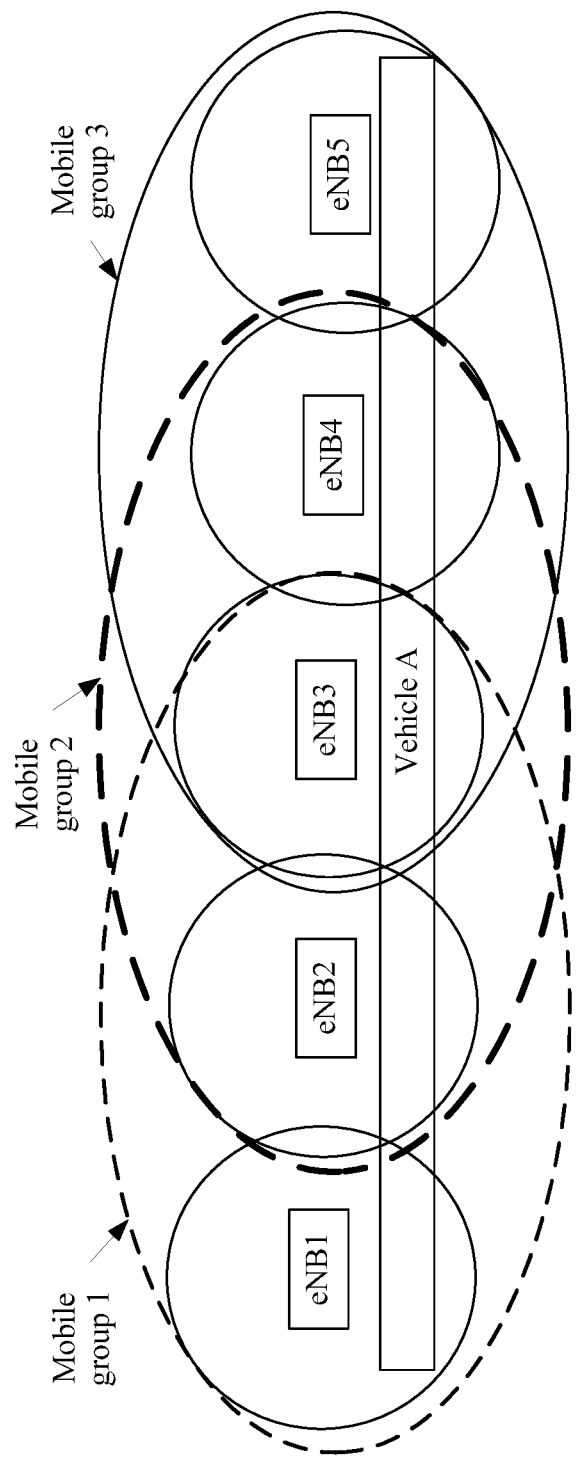
FIG. 3 is a first schematic diagram of cell group division based on a geographical location in the prior art.

As shown in the embodiment illustrated in FIG. 3, in five base stations along a road, an eNB1, an eNB2, and an eNB3 are grouped into a cell group 1, the eNB2, the eNB3, and an eNB4 are grouped into a cell group 2, and the eNB3, the eNB4, and an eNB5 are grouped into a cell group 3. After the vehicle A enters the cell group 2 and sends group communication data to the server in a cell 3 (a cell served by the eNB3), the server broadcasts the group communication data in a cell 2 (a cell served by the eNB2), the cell 3, and a cell 4 (a cell served by the eNB4).

In a scenario of cell group division based on user equipment, using the foregoing method to transmit group communication data can meet an actual requirement. However, in a scenario of cell group division based on a location, a problem that a resource waste occurs or group communication data is not effectively transmitted is caused by using the foregoing method to transmit group communication data.

If the group communication system is deployed by using a macro base station and a cell radius is much greater than 320 meters, the server may need to broadcast group communication data in a current serving cell of user equipment or the current serving cell of the user equipment and some neighboring cells of the user equipment, instead of broadcasting the group communication data in the current serving cell of the user equipment and all neighboring cells of the user equipment.

Figure 4:
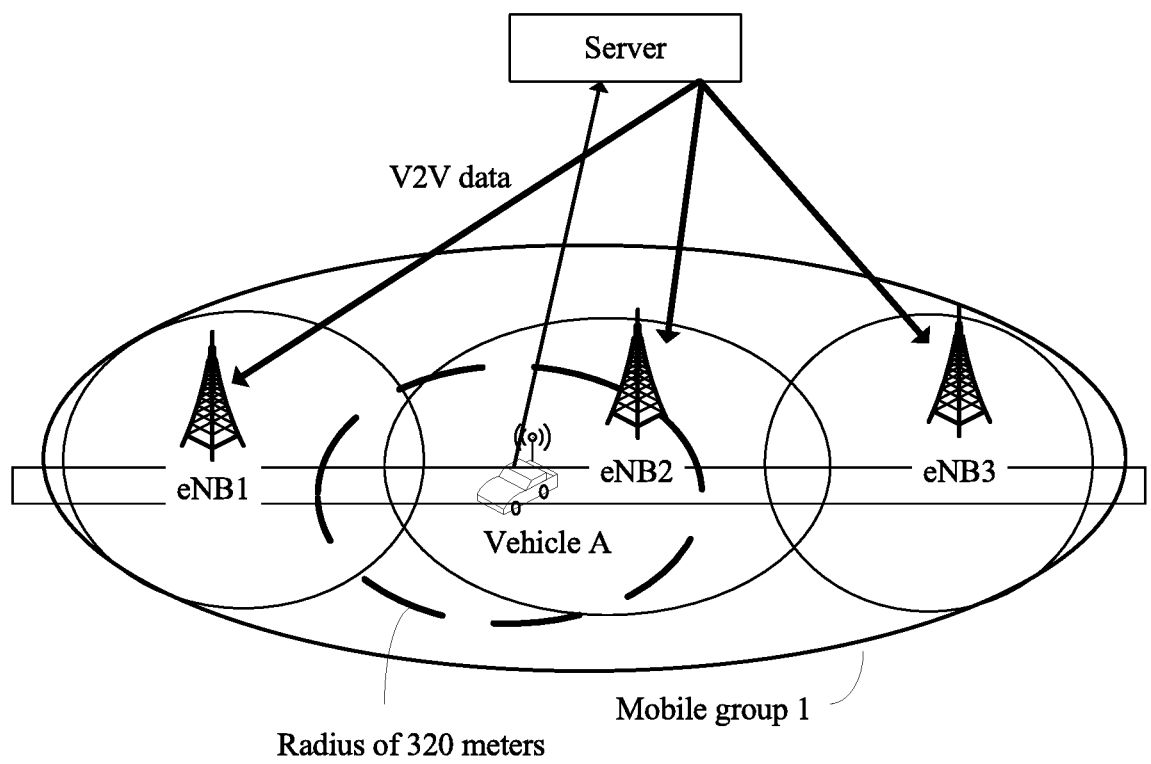
FIG. 4 is a first schematic diagram of transmitting group communication data by using the prior art.

As shown in the embodiment illustrated in FIG. 4, according to an existing cell group division method, an eNB1, an eNB2, and an eNB3 are grouped into a cell group 1, and a vehicle A in a cell 2 (a cell served by the eNB2) sends V2V data to a server. If the V2V data is transmitted by using an existing method, the server broadcasts the V2V data in the cell group 1 (a cell 1 served by the eNB1, the cell 2, and a cell 3 served by the eNB3). However, because a valid transmission distance of the V2V data is at most 320 meters (a dashed line box in the figure indicates an area with the vehicle A as a center and a radius of 320 meters), all vehicles in the cell 3 do not need to receive the V2V data. The V2V data in the figure is broadcast in the cell 1 and the cell 2. As a result, when the V2V data is transmitted by using the existing method, a downlink transmission resource of the cell 3 is wasted.

If the group communication system is deployed by using a micro base station, and a cell radius is less than 320 meters, the server may further need to broadcast group communication data in another cell in addition to the current serving cell of the user equipment and all the neighboring cells of the user equipment.

Figure 5:
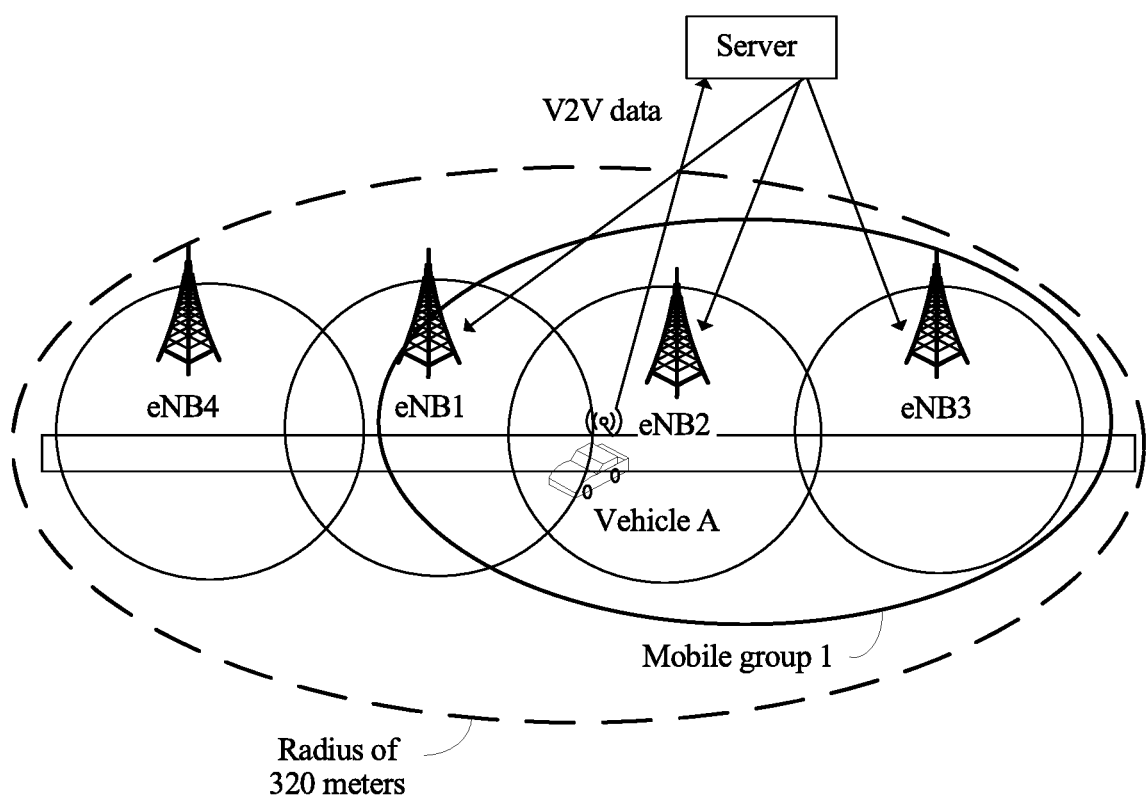
FIG. 5 is a second schematic diagram of transmitting group communication data by using the prior art.

As shown in the embodiment illustrated in FIG. 5, according to an existing cell group division method, an eNB1, an eNB2, and an eNB3 are grouped into a cell group 1, and a vehicle A in a cell 2 (a cell served by the eNB2) sends V2V data to a server. If the V2V data is transmitted by using an existing method, the server broadcasts the V2V data in the cell group 1 (a cell 1 served by the eNB1, the cell 2, and a cell 3 served by the eNB3). However, a valid transmission distance of the V2V data is at most 320 meters. A dashed line box in the figure indicates a coverage area with the vehicle A as a center and a radius of 320 meters, and the coverage area includes the cell 1, the cell 2, the cell 3, and a cell 4 (a cell served by an eNB4). Therefore, a vehicle in the cell 4 also needs to receive the V2V data. However, when the V2V data is transmitted by using the existing method, the vehicle in the cell 4 cannot receive the V2V data. As a result, when the V2V data is transmitted by using the existing method, the V2V data is not effectively transmitted.

The embodiments of the present invention provide a group communication method and system, and a device. A server obtains a first group identifier determined based on location information of first user equipment, and obtains group communication data sent by the first user equipment. Then, the server sends the group communication data in a cell corresponding to the first group identifier based on the first group identifier. Because the first group identifier in the embodiments of the present invention is determined based on the location information of the first user equipment, the group communication method provided in the present invention can be used to accurately identify a cell range in which the group communication data sent by the first user equipment is to be broadcast, and to improve utilization of a downlink transmission resource.

The group communication method and the device provided in the embodiments of the present invention may be applied to a system similar to the group communication system in FIG. 2 and FIG. 3, and are applicable to a group communication service with cell group division based on a geographical location of user equipment.

The server in the embodiments of the present invention is an application server or a broadcast server. For ease of understanding, in the following embodiments of the present invention, that the server is an application server or a broadcast server is used as an example for description.

The application server in the embodiments of the present invention may be a GCS AS in an LTE system, or may be a V2V application server in a V2V communications system. This is not specifically limited in the embodiments of the present invention.

A V2V communications technology refers to a technology enabling vehicles in a V2V wireless network to mutually transmit their respective status information (such as a speed, a location, a driving direction, and a brake).

Figure 6:
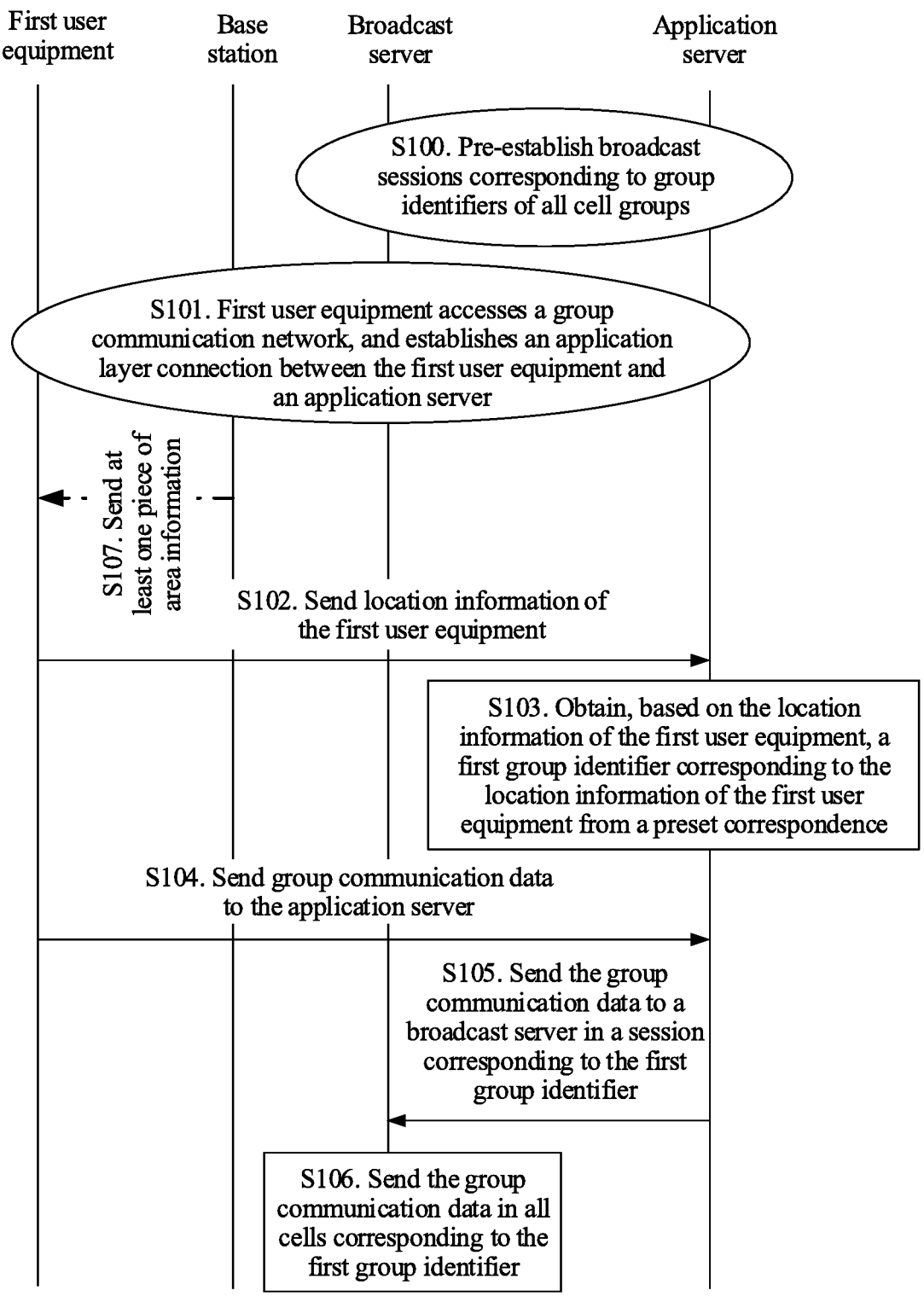
FIG. 6 is a first schematic flowchart of a group communication method according to an embodiment of the present invention.

As shown in FIG. 6, an embodiment of the present invention provides a group communication method, including the following steps:

S100. An application server negotiates with a broadcast server to pre-establish broadcast sessions corresponding to group identifiers of all cell groups.

S101. First user equipment accesses a group communication network, and establishes an application layer connection between the first user equipment and the application server.

S102. The first user equipment sends location information of the first user equipment to the application server.

S103. The application server obtains, based on the location information of the first user equipment, a first group identifier corresponding to the location information of the first user equipment from a preset correspondence.

The preset correspondence stores at least one piece of location information, and a group identifier corresponding to each piece of location information.

S104. The first user equipment sends group communication data to the application server.

S105. The application server sends the group communication data to the broadcast server in a broadcast session corresponding to the first group identifier.

S106. The broadcast server sends the group communication data in a cell corresponding to the first group identifier.

In a process of accessing the group communication network by the first user equipment, the first user equipment may join a plurality of cell groups according to a location of the first user equipment, or one cell group may be configured in the entire group communication network, and the first user equipment joins the cell group.

In an embodiment, a network bearer is established between the first user equipment and a base station serving the first user equipment, and the network bearer is used to transmit group communication data.

Optionally, when the first user equipment accesses the group communication network, the first user equipment receives configuration information sent by the application server. The configuration information is used to indicate a rule used by the first user equipment to send the location information of the first user equipment to the application server.

The location information of the first user equipment is geographical location information of the first user equipment or area information of the first user equipment.

The geographical location information of the first user equipment may be two-dimensional geographical location information indicated by using longitude and latitude coordinates.

For example, current geographical location information of the first user equipment is a location B, and longitude and latitude coordinates of the location B are (x, y).

Optionally, in this embodiment of the present invention, nodes (including user equipment, the base station, the application server, and the broadcast server) in the group communication network system divide a longitude and latitude grid into a plurality of areas according to a pre-agreed area division rule, and information of each area is different. Therefore, the area information of the first user equipment refers to area information of the first user equipment that is determined by the first user equipment according to the pre-agreed area division rule.

Optionally, in this embodiment of the present invention, the base station in the group communication network system divides a coverage area of at least one cell in the group communication network system into at least one area according to an area division rule. Information of each area is different. The base station sends at least one piece of area information to the first user equipment, and the first user equipment obtains the location information of the first user equipment, and uses area information to which the location information of the first user equipment belongs in the at least one piece of area information, as the area information of the first user equipment. In this application scenario, the application server and the broadcast server may interact with the base station in advance to learn of the at least one piece of area information.

The area information in this embodiment of the present invention includes longitude and latitude information of a boundary point of the area range or longitude and latitude information of a center point of the area and a radius of the area.

The configuration information sent by the application server to the first user equipment is at least one of a reporting period of the location information of the first user equipment, a report format of the location information of the first user equipment, and a reporting trigger condition of the location information of the first user equipment.

The report format of the location information of the first user equipment may be complete location information, or may be location information that meets specific precision.

The reporting trigger condition of the location information of the first user equipment may be any one of the following:

1. If a current moment meets configuration of the reporting period, the first user equipment sends the location information of the first user equipment to the application server at the current moment.

2. If a distance between current location information of the first user equipment and location information sent by the first user equipment to the application server last time is greater than or equal to a preset threshold, the first user equipment sends the current location information of the first user equipment to the application server.

3. If the area information of the first user equipment changes, the first user equipment sends current area information of the first user equipment to the application server.

After accessing the group communication network, the first user equipment sends the location information of the first user equipment to the application server; in other words, the first user equipment performs S102.

The first user equipment first obtains the location information of the first user equipment.

If the location information of the first user equipment is the geographical location information of the first user equipment, the first user equipment may obtain the geographical location information of the first user equipment by using any existing positioning technology.

For example, if the first user equipment has a positioning function, the first user equipment determines its own geographical location information by using a satellite positioning technology, or determines its own geographical location information by using an inertial navigation technology.

If the location information of the first user equipment is the area information of the first user equipment, the first user equipment first determines the geographical location information of the first user equipment, and then the first user equipment determines, by using the geographical location information of the first user equipment, the area information of the first user equipment according to the pre-agreed area division rule or from the at least one piece of area information obtained from the base station. For a method for determining its own geographical location information by the first user equipment, refer to the foregoing description, and details are not described herein again.

After obtaining the location information of the first user equipment, the first user equipment sends the location information of the first user equipment to the application server.

In the Internet of Vehicles, the first user equipment may add the location information of the first user equipment to a cooperative awareness message (CAM), and send the message to a V2V application server.

If the location information of the first user equipment is the area information of the first user equipment, a method for sending the area information by the first user equipment to the application server may be any one of the following two methods:

1. The first user equipment first determines current area information of the first user equipment, and then the first user equipment determines whether the current area information of the first user equipment is the same as area information sent by the first user equipment to the application server last time. If the current area information of the first user equipment is different from area information sent by the first user equipment to the application server last time, the first user equipment sends the current area information of the first user equipment to the application server.

2. The first user equipment determines current area information of the first user equipment, and sends the current area information of the first user equipment to the application server.

Further, if the first user equipment receives the configuration information sent by the application server after accessing the group communication network, the first user equipment sends the location information of the first user equipment to the application server by using the rule indicated by the configuration information.

If the configuration information received by the first user equipment includes the reporting trigger condition of the location information of the first user equipment, the first user equipment sends the location information of the first user equipment to the application server according to the reporting trigger condition.

It should be noted that, to prevent an unnecessary error in a communication process, when sending the location information to the application server, the first user equipment further sends an identifier of the first user equipment.

After receiving the location information sent by the first user equipment, the application server obtains, based on the location information of the first user equipment, the first group identifier corresponding to the location information of the first user equipment from the preset correspondence; in other words, performs S103.

The preset correspondence stores at least one piece of location information, and a group identifier corresponding to each piece of location information. The at least one piece of location information may be at least one piece of geographical location information, or may be area information corresponding to each broadcast session.

It may be understood that the preset correspondence stores a correspondence between the location information of the first user equipment and the first group identifier.

If the preset correspondence stores at least one piece of geographical location information and a group identifier corresponding to each piece of geographical location information, after receiving the geographical location information of the first user equipment, the application server can obtain, based on the geographical location information of the first user equipment, the first group identifier corresponding to the geographical location information of the first user equipment from the preset correspondence.

Likewise, if the preset correspondence stores at least one piece of area information and a group identifier corresponding to each piece of area information, after receiving the area information of the first user equipment, the application server can obtain, based on the area information of the first user equipment, the first group identifier corresponding to the area information of the first user equipment from the preset correspondence.

Optionally, in this embodiment of the present invention, the first group identifier may be an application layer group identifier, or may be a communication layer group identifier, or may be a cell identity of at least one cell included in a first cell group indicated by the first group identifier, or may be a broadcast session flow identifier corresponding to the first group identifier, or the like.

Preferably, the communication layer group identifier is a TMGI.

It should be noted that, in this embodiment of the present invention, the broadcast session flow identifier is different from a flow identifier flow ID of a current GCSE technology.

The flow ID of the GCSE technology is used to distinguish between different broadcast server control areas of a same cell group, and a same cell group is corresponding to different flow IDs. Broadcast session areas corresponding to the flow IDs are definitely not overlapped, and are definitely located in control ranges of different broadcast servers.

However, in this embodiment of the present invention, the broadcast session flow identifier is to identify an area corresponding to a specific cell set in an area corresponding to a same cell group. When the application server establishes a broadcast session connection to the broadcast server, a broadcast session flow identifier is used to establish a broadcast session. The broadcast session is corresponding to one downlink broadcast/multicast cell list, and the cells may be located in control ranges of different broadcast servers.

In addition, the first cell group may include one cell, or may include at least two cells. Therefore, the first cell group may be represented by a cell identity of at least one cell included in the cell group. If the first cell group includes one cell (a cell A), the first cell group may be represented by the cell A. If the first cell group includes three cells (a cell A, a cell B and a cell C), the first cell group may be represented by a cell list that includes the cell A, the cell B, and the cell C.

If the preset correspondence stores at least one piece of location information and at least one cell identity corresponding to each piece of location information, after obtaining the location information of the first user equipment, the application server obtains, based on the location information of the first user equipment, at least one cell identity corresponding to the location information of the first user equipment from the preset correspondence.

Further, the application server further determines, based on the at least one cell identity corresponding to the location information of the first user equipment, a broadcast session flow identifier for sending the group communication data from the pre-established broadcast sessions corresponding to the group identifiers of all the cell groups.

After receiving the group communication data sent by the first user equipment, the application server sends the group communication data to the broadcast server in the broadcast session corresponding to the first group identifier, and the broadcast server sends the group communication data in the cell corresponding to the first group identifier; in other words, S104 to S106 are performed.

S104 to S106 are the same as those in the prior art, and details are not described in detail in this embodiment of the present invention.

Optionally, in this embodiment of the present invention, the first user equipment may perform S102 before S104, or may perform S104 before S102, or perform S102 and S104 at the same time. This is not specifically limited in this embodiment of the present invention.

It may be understood that, to prevent an unnecessary error in the communication process, when sending the group communication data to the application server, the first user equipment further sends the identifier of the first user equipment.

Optionally, if the first user equipment in this embodiment of the present invention determines the area information of the first user equipment based on at least one piece of area information sent by the base station, before the first user equipment sends the location information of the first user equipment to the application server, the first user equipment further receives the at least one piece of area information sent by the base station.

As shown in FIG. 6, before S102, the group communication method provided in this embodiment of the present invention may further include S107.

S107. A base station sends at least one piece of area information to the first user equipment.

The base station may send the at least one piece of area information to the first user equipment by using a system message, or may send the at least one piece of area information to the first user equipment by using an radio resource control (RRC) message. This is not specifically limited in this embodiment of the present invention.

S107 is an optional step, and therefore S107 is represented by a dashed line in FIG. 6.

In this embodiment of the present invention, the application server determines the first group identifier based on the location information sent by the first user equipment, so as to send, in the cell corresponding to the first group identifier, the group communication data sent by the first user equipment. Because the first group identifier is determined based on the location information of the first user equipment, the cell corresponding to the first group identifier can meet a transmission distance requirement of the group communication data. That is, in the group communication method provided in this embodiment of the present invention, a cell range in which the group communication data sent by the first user equipment is to be broadcast can be accurately identified, and utilization of a downlink transmission resource can be improved.

Figure 7:
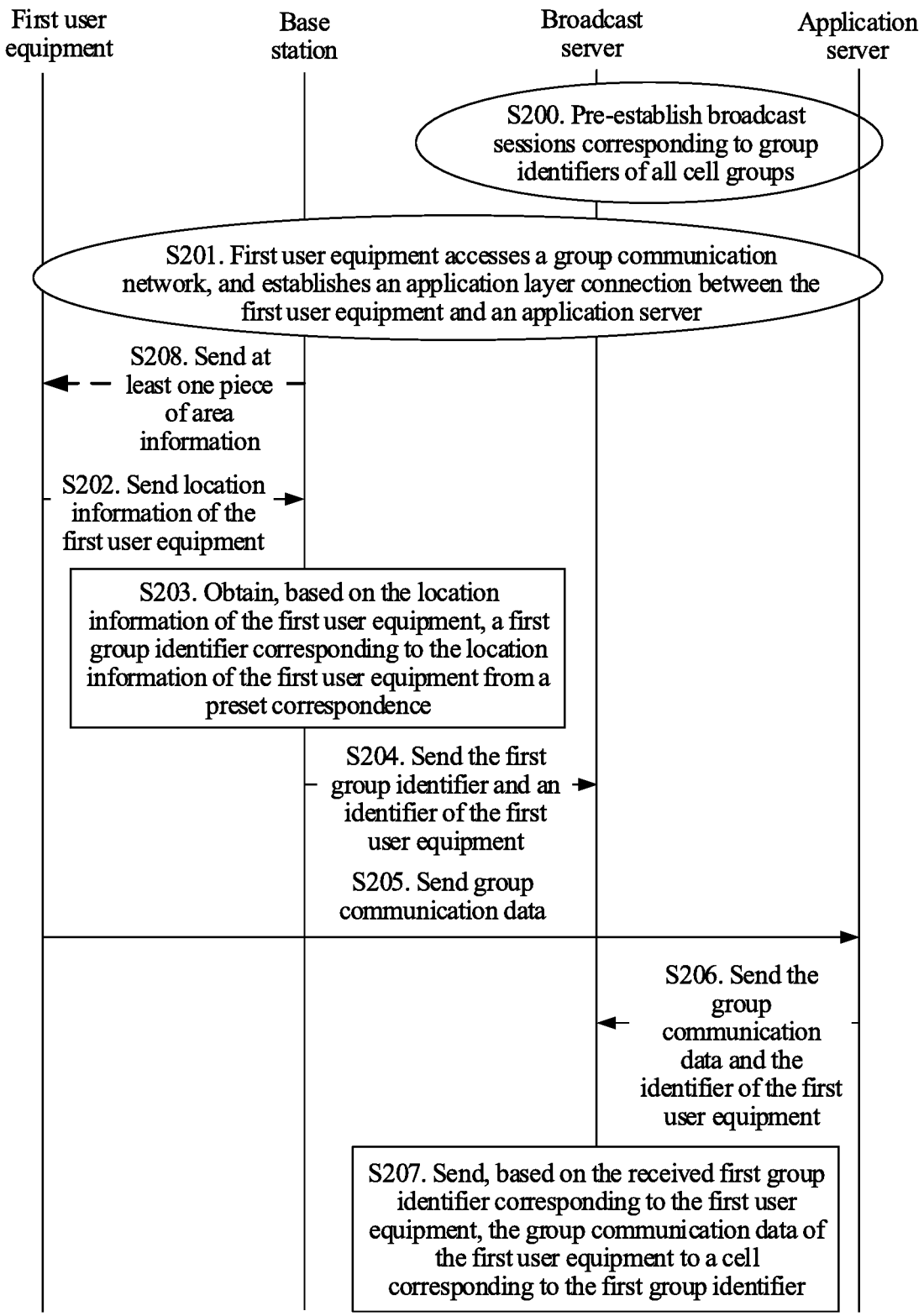
FIG. 7 is a second schematic flowchart of a group communication method according to an embodiment of the present invention.

As shown in FIG. 7, another embodiment of the present invention provides a group communication method, including the following steps:

S200. An application server negotiates with a broadcast server to pre-establish broadcast sessions corresponding to group identifiers of all cell groups.

S201. First user equipment accesses a communication network, and establishes an application layer connection between the first user equipment and the application server.

S202. The first user equipment sends location information of the first user equipment to a base station.

S203. The base station obtains, based on the location information of the first user equipment, a first group identifier corresponding to the location information of the first user equipment from a preset correspondence.

S204. The base station sends the first group identifier and an identifier of the first user equipment to the broadcast server.

S205. The first user equipment sends group communication data to the application server.

S206. The application server sends the group communication data and the identifier of the first user equipment to the broadcast server.

S207. The broadcast server sends, based on the first group identifier that is corresponding to the first user equipment and that is received by the broadcast server, the group communication data of the first user equipment to a cell corresponding to the first group identifier.

S200 in this embodiment of the present invention is the same as S100 in the foregoing embodiment, and S207 is the same as S106 in the foregoing embodiment. Details are not described herein again.

Different from the foregoing embodiment, in this embodiment of the present invention, when the first user equipment accesses the group communication network; in other words, when the first user equipment performs S201, the first user equipment receives configuration information sent by the base station. The configuration information is used to indicate a rule used by the first user equipment to send the location information of the first user equipment to the base station.

In this embodiment of the present invention, for a specific definition of the configuration information and the location information of the first user equipment, refer to the foregoing embodiment, and details are not described herein again.

In this embodiment of the present invention, the first user equipment may receive, by using a system message, the configuration information sent by the base station, or may receive, by using an RRC message, the configuration information sent by the base station. This is not specifically limited in this embodiment of the present invention.

A method for obtaining its own location information by the first user equipment in this embodiment of the present invention is the same as the method for obtaining its own location information by the first user equipment in the foregoing embodiment, and details are not described herein again.

Optionally, in a process of establishing the application layer connection between the first user equipment and the application server, the first user equipment sends a service identifier to the application server. The service identifier is used to indicate a service type of the group communication data. For example, the service identifier is used to indicate a V2V service or a V2I service in the Internet of Vehicles.

In this embodiment of the present invention, after obtaining the location information of the first user equipment, the first user equipment sends its location information to the base station; in other words, the first user equipment performs S202.

In this embodiment of the present invention, for a method for sending its own location information by the first user equipment to the base station, refer to the method for sending its own location information by the first user equipment to the application server, and details are not described herein again.

What is different is as follows: In the foregoing embodiment, the first user equipment sends the location information of the first user equipment to the application server, but in this embodiment of the present invention, the first user equipment sends the location information of the first user equipment to the base station.

Likewise, in this embodiment of the present invention, when sending the location information of the first user equipment to the base station, the first user equipment further sends the identifier of the first user equipment.

After receiving the location information sent by the first user equipment, the base station obtains, based on the location information of the first user equipment, the first group identifier corresponding to the location information of the first user equipment from the preset correspondence; in other words, performs S203.

Information stored in the preset correspondence in this embodiment of the present invention is the same as the information stored in the preset correspondence in the foregoing embodiment. A difference is that the preset correspondence in this embodiment of the present invention is stored in the base station, but the preset correspondence in the foregoing embodiment is stored in the application server.

After determining the first group identifier, the base station sends the first group identifier to the broadcast server by using the group communication network.

It should be noted that, to prevent an unnecessary error in a communication process, when sending the first group identifier to the broadcast server, the base station further needs to send the identifier of the first user equipment. Simply, the base station sends the first group identifier and the identifier of the first user equipment to the broadcast server; in other words, performs S204.

The base station may send the first group identifier and the identifier of the first user equipment to the broadcast server by using a first signaling channel. The first signaling channel includes a signaling channel between the base station and an multi-cell/multicast coordination entity (MCE), a signaling channel between the MCE and an mobility management entity (MME), a signaling channel between the MME and an multimedia broadcast multicast service gateway (MBM-GW), and a signaling channel between the MBM-GW and the broadcast server.

The base station may alternatively send the first group identifier and the identifier of the first user equipment to the broadcast server by using a second signaling channel. The second signaling channel includes a signaling channel between the base station and an serving gateway (S-GW), a signaling channel between the S-GW and a packet data network gateway (P-GW), and a signaling channel between the P-GW and the broadcast server.

Optionally, when the base station sends the first group identifier and the identifier of the first user equipment to the broadcast server, the base station may further send a validity period of the first group identifier to the broadcast server. In this way, after the validity period expires, the broadcast server no longer uses the first group identifier to send the group communication data, so as to effectively broadcast the group communication data.

Optionally, when the base station sends the first group identifier and the identifier of the first user equipment to the broadcast server, the base station may further send a service identifier to the broadcast server.

For example, the service identifier is used to represent the Internet of Vehicles service. After the broadcast server receives the first group identifier and the service identifier that indicates the Internet of Vehicles service, the broadcast server may learn, according to the service identifier, that the Internet of Vehicles service can be used in the cell corresponding to the first group identifier.

Likewise, when the first user equipment sends the group communication data to the application server in S205, the first user equipment further sends the identifier of the first user equipment to the application server. Further, the application server sends the group communication data and the identifier of the first user equipment to the broadcast server; in other words, performs S206.

Correspondingly, after receiving the group communication data and the identifier of the first user equipment that are sent by the application server, the broadcast server may learn, according to the identifier of the first user equipment, that the broadcast server needs to send the group communication data to the cell corresponding to the first group identifier.

If the application server receives the service identifier sent by the first user equipment in a process of accessing the communication network by the first user equipment, after obtaining the group communication data, the application server sends the group communication data and the identifier of the first user equipment to the broadcast server in a broadcast session corresponding to the service identifier. The broadcast server may learn of a service type of the group communication data by using the broadcast session.

The broadcast server sends, according to a first group identifier that is corresponding to the first user equipment and that is received by the broadcast server last time, the group communication data to a cell corresponding to the first group identifier.

It should be noted that, in this embodiment of the present invention, the first user equipment may send the group communication data to the application server at any moment after the first user equipment accesses the group communication network; in other words, S205 may be performed at any moment after S201.

Optionally, if the location information of the first user equipment in this embodiment of the present invention is area information of the first user equipment, and the area information of the first user equipment is determined by the first user equipment based on at least one piece of area information sent by the base station, before the first user equipment sends the area information of the first user equipment to the base station, the first user equipment further receives the at least one piece of area information sent by the base station.

As shown in FIG. 7, before S202, the group communication method provided in this embodiment of the present invention may further include S208.

S208. The base station sends at least one piece of area information to the first user equipment.

S208 is an optional step, and therefore S208 is represented by a dashed line in FIG. 7.

S208 in this embodiment of the present invention is the same as S107 in the foregoing embodiment, and details are not described herein again.

Compared with the foregoing embodiment, in this embodiment of the present invention, a manner of determining the first group identifier by the base station reduces deployment costs of a core network and calculation complexity.

Figure 8:
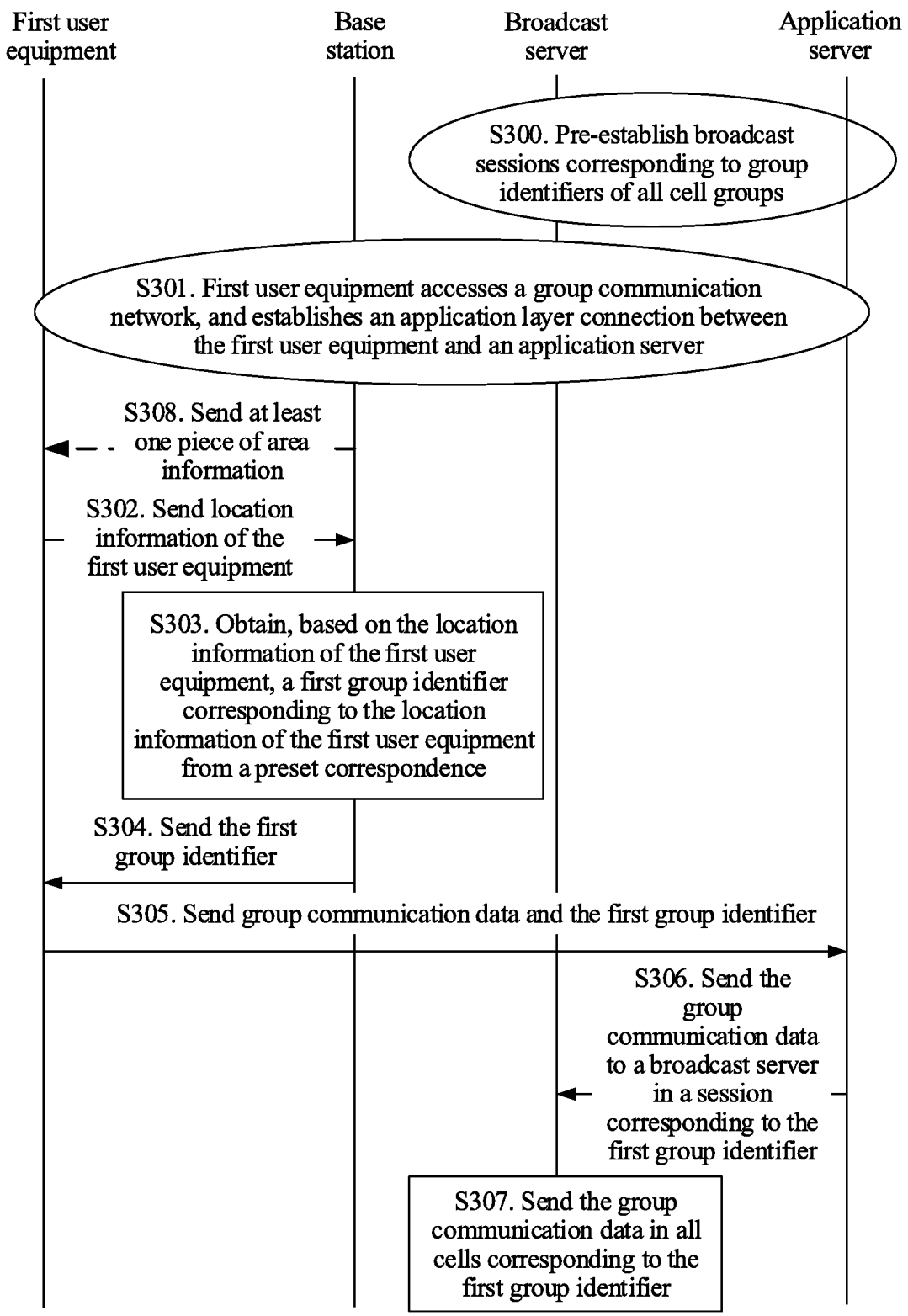
FIG. 8 is a third schematic flowchart of a group communication method according to an embodiment of the present invention.

As shown in FIG. 8, another embodiment of the present invention provides a group communication method, including the following steps:

S300. An application server negotiates with a broadcast server to pre-establish broadcast sessions corresponding to group identifiers of all cell groups.

S301. First user equipment accesses a group communication network, and establishes an application layer connection between the first user equipment and the application server.

S302. The first user equipment sends location information of the first user equipment to a base station.

S303. The base station obtains, based on the location information of the first user equipment, a first group identifier corresponding to the location information of the first user equipment from a preset correspondence.

S304. The base station sends the first group identifier to the first user equipment.

S305. The first user equipment sends the first group identifier and group communication data to the application server.

S306. The application server sends the group communication data to the broadcast server in a session corresponding to the first group identifier.

S307. The broadcast server sends the group communication data in all cells corresponding to the first group identifier.

S300 to S303 in this embodiment of the present invention are the same as S200 to S203 in the foregoing embodiment, and S306 and S307 are the same as S105 and S106 in the foregoing embodiment. Details are not described herein again.

Different from the foregoing embodiment, in this embodiment of the present invention, after determining the first group identifier, the base station sends the first group identifier to the first user equipment in S304. In this way, the first group identifier can be transmitted directly between the first user equipment and the application server by using an application layer message.

In this embodiment of the present invention, when the first user equipment performs S305, the first user equipment may simultaneously send the first group identifier and the group communication data to the application server, or may first send the first group identifier to the application server and then send the group communication data to the application server, or may first send the group communication data to the application server and then send the first group identifier to the application server. This is not specifically limited in this embodiment of the present invention.

Optionally, if the location information of the first user equipment in this embodiment of the present invention is area information of the first user equipment, and the area information of the first user equipment is determined by the first user equipment based on at least one piece of area information sent by the base station, before the first user equipment sends the area information of the first user equipment to the base station, the first user equipment further receives the at least one piece of area information sent by the base station.

As shown in FIG. 8, before S302, the group communication method provided in this embodiment of the present invention may further include S308.

S308. The base station sends at least one piece of area information to the first user equipment.

S308 is an optional step, and therefore S308 is represented by a dashed line in FIG. 8.

S308 in this embodiment of the present invention is the same as S208 in the foregoing embodiment, and details are not described herein again.

Compared with the foregoing embodiment, in this embodiment of the present invention, the first user equipment may directly send the first group identifier to the application server by using the application layer message without needing to use a signaling channel on a network side, so that load used by the server to receive the first group identifier is reduced, and core network deployment costs are reduced.

Figure 9:
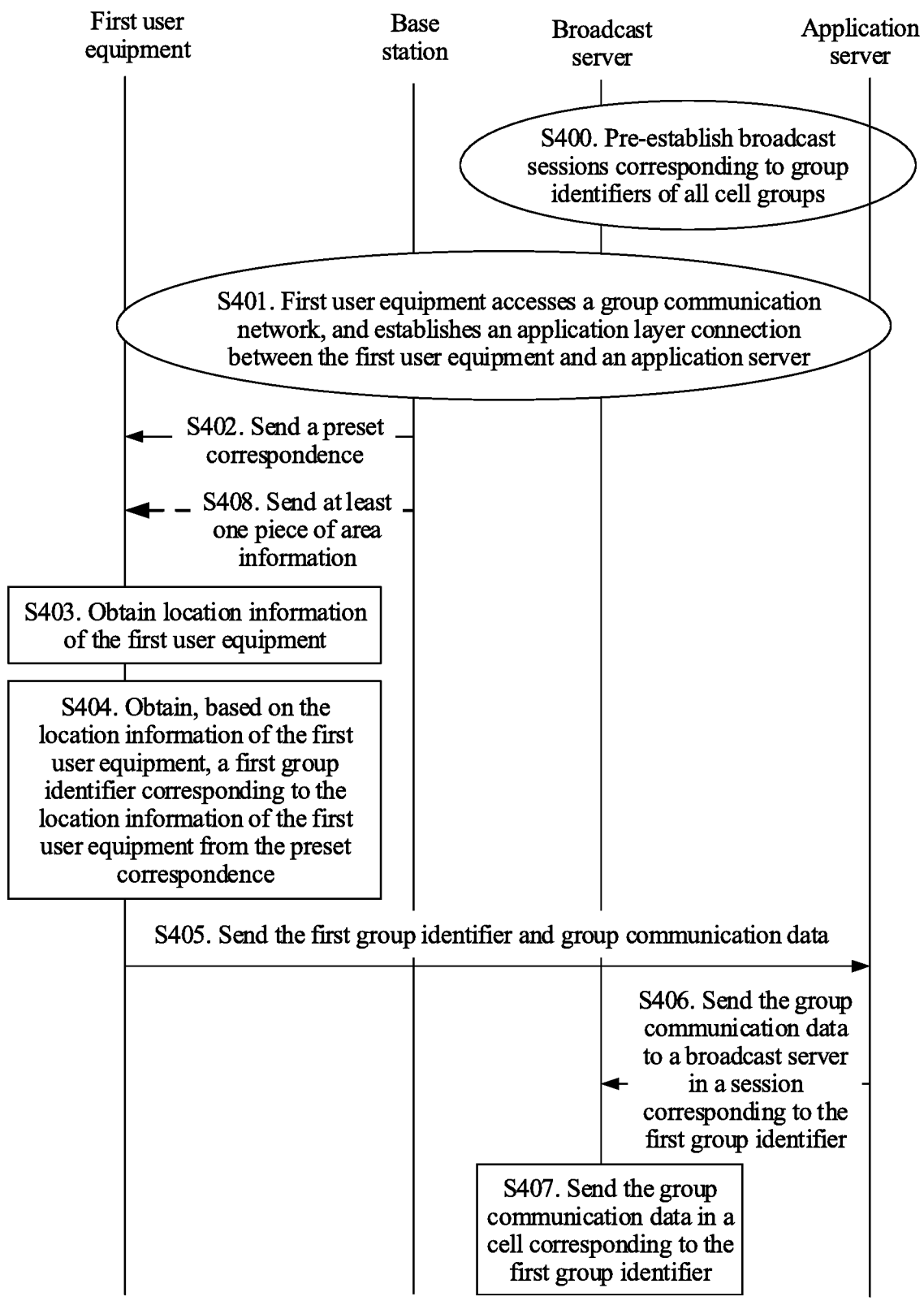
FIG. 9 is a fourth schematic flowchart of a group communication method according to an embodiment of the present invention.

As shown in FIG. 9, another embodiment of the present invention provides a group communication method, including the following steps:

S400. An application server negotiates with a broadcast server to pre-establish broadcast sessions corresponding to group identifiers of all cell groups.

S401. First user equipment accesses a group communication network, and establishes an application layer connection between the first user equipment and the application server.

S402. A base station sends a preset correspondence to the first user equipment.

The preset correspondence in this embodiment of the present invention stores at least one piece of location information, and a group identifier corresponding to each piece of location information.

S403. The first user equipment obtains location information of the first user equipment.

S404. The first user equipment obtains, based on the location information of the first user equipment, a first group identifier corresponding to the location information of the first user equipment from the preset correspondence.

S405. The first user equipment sends the first group identifier and group communication data to the application server.

S406. The application server sends the group communication data to the broadcast server in a session corresponding to the first group identifier.

S407. The broadcast server sends the group communication data in a cell corresponding to the first group identifier.

S400 and S401 in this embodiment of the present invention are the same as S300 and S301 in the foregoing embodiment, and S405 to S407 are the same as S305 to S307 in the foregoing embodiment. Details are not described herein again.

In this embodiment of the present invention, the base station stores the preset correspondence, and the preset correspondence stores at least one piece of location information, and a group identifier corresponding to each piece of location information.

A method for sending the second preset correspondence by the base station to the first user equipment in S402 may be as follows: The base station may send the preset correspondence to the first user equipment by using a system message, or may send the preset correspondence to the first user equipment by using an RRC message. This is not specifically limited in this embodiment of the present invention.

For a method for obtaining the location information of the first user equipment by the first user equipment in S403, refer to the method for obtaining the location information of the first user equipment by the first user equipment in the foregoing embodiment, and details are not described herein again.

After determining its own location information, the first user equipment obtains the first group identifier corresponding to the location information of the first user equipment from the preset correspondence; in other words, the first user equipment performs S404.

Further, after obtaining the first group identifier, the first user equipment sends the first group identifier and the group communication data to the application server.

A method for sending the first group identifier to the application server by the first user equipment in this embodiment of the present invention may be any one of the following two methods:

1. The first user equipment first determines a first group identifier corresponding to current area information of the first user equipment, and then the first user equipment determines whether the first group identifier is the same as a group identifier sent by the first user equipment to the application server last time. If the first group identifier is different from a group identifier sent by the first user equipment to the application server last time, the first user equipment sends the first group identifier to the application server.

2. The first user equipment determines a first group identifier corresponding to current area information of the first user equipment, and sends the first group identifier to the application server.

According to the group communication method provided in this embodiment of the present invention, the first user equipment may directly transmit the group communication data and the first group identifier by using an application layer message.

Optionally, if the location information of the first user equipment in this embodiment of the present invention is area information of the first user equipment, and the area information of the first user equipment is determined by the first user equipment based on at least one piece of area information sent by the base station, before the first user equipment obtains the area information of the first user equipment, the first user equipment further receives the at least one piece of area information sent by the base station.

As shown in FIG. 9, before S403, the group communication method provided in this embodiment of the present invention may further include S408.

S408. The base station sends at least one piece of area information to the first user equipment.

S408 is an optional step, and therefore S408 is represented by a dashed line in FIG. 9.

S408 in this embodiment of the present invention is the same as S309 in the foregoing embodiment, and details are not described herein again.

It should be noted that, in this embodiment of the present invention, S402 may be performed before S408, or S408 may be performed before S402, or S408 and S402 may be performed at the same time. This is not specifically limited in this embodiment of the present invention.

Compared with the foregoing embodiment, the first user equipment in the present invention determines by itself the first group identifier, and sends the first group identifier to the application server by using the application layer message, thereby reducing load of the base station and the server.

Figure 10:
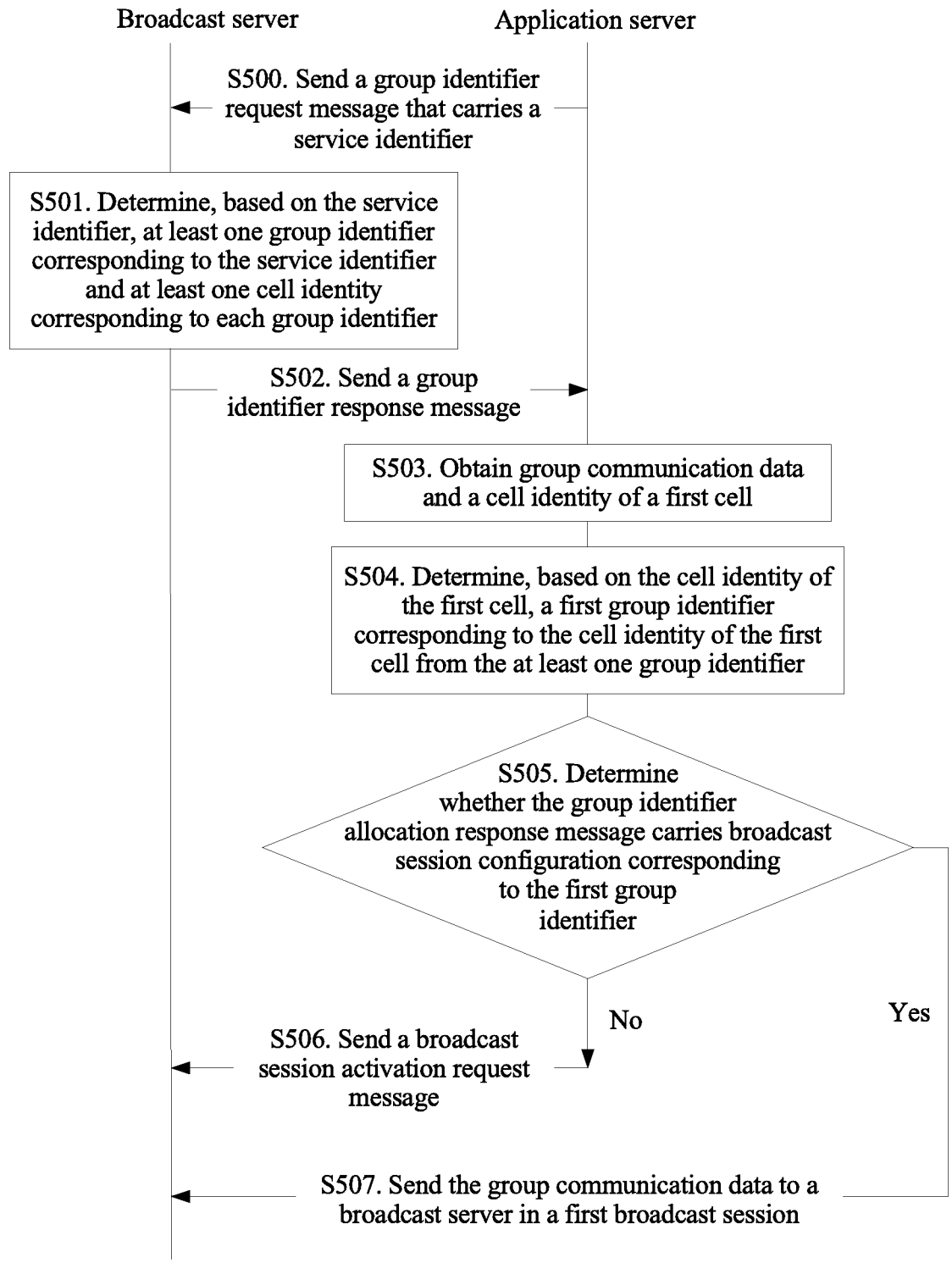
FIG. 10 is a fifth schematic flowchart of a group communication method according to an embodiment of the present invention.

As shown in FIG. 10, another embodiment of the present invention provides a group communication method, including the following steps:

S500. An application server sends a group identifier request message that carries a service identifier to a broadcast server.

The service identifier is used to represent a service type of group communication data.

For example, the group identifier request message in all embodiments of the present invention is an allocate TMGI request message in an LTE system. The TMGI allocation message carries a service identifier that indicates an Internet of Vehicles service. After receiving the TMGI allocation message sent by the application server, the broadcast server may learn, according to the service identifier, that the application server needs to learn of a group identifier that belongs to the Internet of Vehicles service.

S501. The broadcast server determines, based on the service identifier, at least one group identifier corresponding to the service identifier and at least one cell identity corresponding to each group identifier.

S502. The broadcast server sends a group identifier response message to the application server.

The group identifier response message carries the at least one group identifier determined by the broadcast server according to the service identifier and the at least one cell identity corresponding to each group identifier.

For example, the group identifier response information in all the embodiments of the present invention is an allocate TMGI response message in the LTE system.

Further, the group identifier response message in this embodiment of the present invention may further carry broadcast session configuration (for example, cell identities of all cells corresponding to each broadcast session, a port number of each broadcast session, multicast Internet Protocol (Multicast Internet Protocol, multicast IP) address information, or GPRS Tunneling Protocol (GTP) tunnel configuration information) corresponding to all cells included in each mobile group. The broadcast session configuration is applicable to all embodiments of the present invention.

S503. The application server obtains group communication data and a cell identity of a first cell that are sent by first user equipment.

The first cell is a cell to which the first user equipment belongs.

S504. The application server determines, based on the cell identity of the first cell, a first group identifier corresponding to the cell identity of the first cell from the at least one group identifier.

S505. The application server determines whether the group identifier response message carries broadcast session configuration corresponding to the first group identifier.

S506. If the group identifier allocation response message does not carry the broadcast session configuration corresponding to the first group identifier, the application server sends a broadcast session activation request message to the broadcast server.

The broadcast session activation request message carries the first group identifier.

For example, the broadcast session activation request message is an MBMS session activation request message in the LTE system.

S507. If the group identifier allocation response message carries the broadcast session configuration corresponding to the first group identifier, the application server sends the group communication data to the broadcast server in a first broadcast session.

The first broadcast session is a broadcast session, corresponding to the first group identifier, established between the application server and the broadcast server.

Optionally, before the broadcast server in this embodiment of the present invention performs S502, the broadcast server further establishes, according to the service identifier, at least one broadcast session used to transmit group communication data.

Figure 11A:
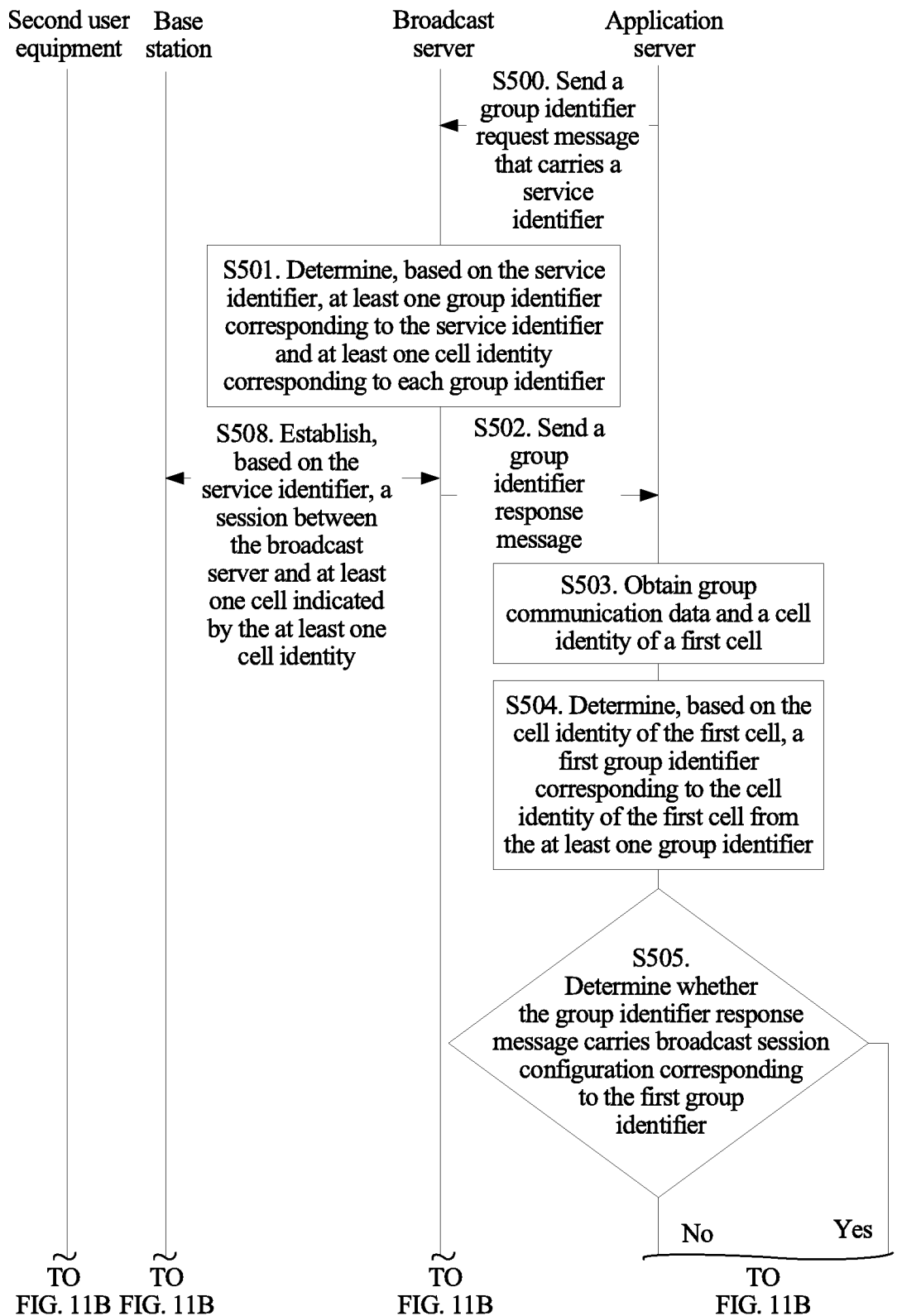
FIG. 11A and FIG. 11B are a sixth schematic flowchart of a group communication method according to an embodiment of the present invention.
Figure 11B:
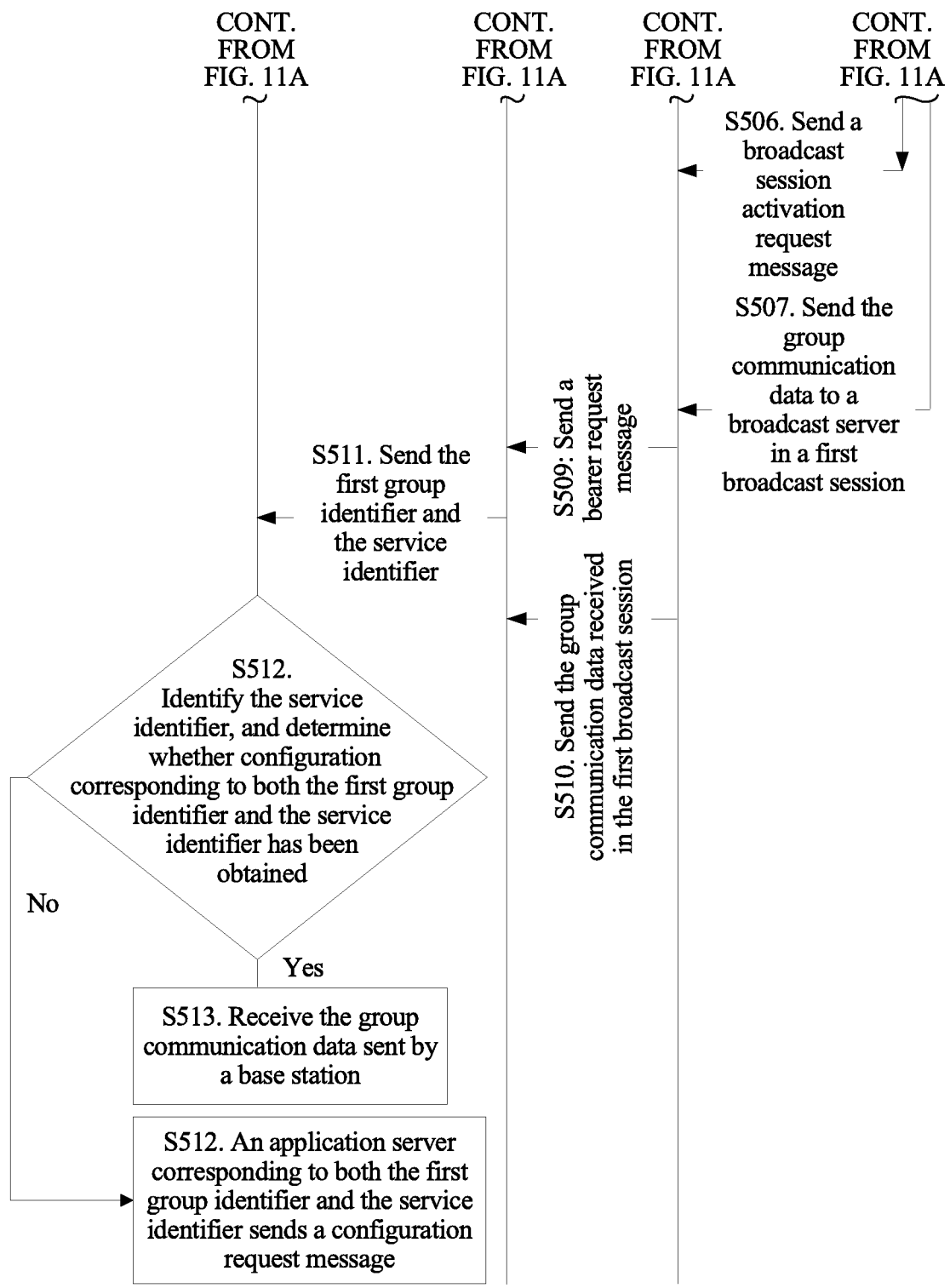

With reference to FIG. 10, as shown in embodiments illustrated in FIG. 11A and FIG. 11B, before S502, the group communication method provided in this embodiment of the present invention further includes:

S508. The broadcast server establishes, based on the service identifier, a session between the broadcast server and at least one cell indicated by the at least one cell identity.

Further, as shown in FIG. 11A and FIG. 11B, after the broadcast server establishes the session between the broadcast server and the at least one cell indicated by the at least one cell identity and receives, in the first broadcast session, the group communication data sent by the application server, the group communication method provided in this embodiment of the present invention further includes:

S509. The broadcast server sends, to a base station, a bearer request message that carries the first group identifier and the service identifier.

The service identifier is corresponding to the first group identifier.

S510. The broadcast server sends, to the base station, the group communication data received by the broadcast server in the first broadcast session.

S511. The base station sends the first group identifier and the service identifier to user equipment served by the base station.

In this embodiment of the present invention, the first group identifier and the service identifier that are sent by the base station to the user equipment served by the base station may be carried in a same field, or may be carried in different fields. This is not specifically limited in this embodiment of the present invention.

S512. Second user equipment identifies the service identifier, and determines whether the second user equipment has obtained configuration corresponding to both the first group identifier and the service identifier.

The second user equipment is one user equipment served by the base station.

S512. If the second user equipment does not obtain the configuration corresponding to both the first group identifier and the service identifier, the second user equipment sends a configuration request message to the application server corresponding to both the first group identifier and the service identifier, so as to obtain the configuration corresponding to both the service identifier and the first group identifier.

S513. If the second user equipment has obtained the configuration corresponding to both the first group identifier and the service identifier, the second user equipment receives the group communication data that is sent by the base station and corresponding to both the first group identifier and the service identifier.

In the group communication method provided in this embodiment of the present invention, the user equipment does not need to store a group identifier corresponding to the service identifier. In an application scenario in which application servers are densely deployed in a network, according to the group communication method provided in this embodiment of the present invention, the user equipment can store fewer group identifiers with lower complexity, and a capability of the user equipment to identify a broadcast service according to a service type is further improved.

For example, for the Internet of Vehicles service, in an application scenario in which a large quantity of V2I application servers (such as electronic traffic lights or electronic speed limit boards) are deployed in the Internet of Vehicles, if the group communication method provided in this embodiment of the present invention is used, each V2I application server needs to establish a broadcast session of a V2I service with a broadcast server, and add a service identifier used to indicate a V2I service type to a group identifier that is corresponding to the V2I service and that is broadcast on an air interface. Therefore, a service type of the broadcast session can be learned of by any vehicle according to the service identifier, so as to determine whether the vehicle needs to receive a service of the service type.

If the V2P application server and the broadcast server establish a broadcast session of a V2P service, and a service identifier used to indicate the V2P service type is carried in a group identifier that is corresponding to the V2P service and that is broadcast on the air interface, a handheld terminal needs to determine whether the handheld terminal needs to receive V2P information, so as to determine whether to subsequently obtain configuration of the broadcast session and receive the broadcast session; and does not need to care about another broadcast session in the Internet of Vehicles. In this way, receiving energy consumption of the handheld terminal device can be reduced.

It should be noted that, in the foregoing embodiments of the present invention, when sending the first group identifier, each node in the group communication network system may further send a validity period of the first group identifier. In this way, after the validity period expires, the server no longer uses the first group identifier to send the group communication data, so as to effectively broadcast the group communication data.

An embodiment of the present invention provides a server 1. The server 1 is configured to perform steps performed by the application server or the broadcast server in the foregoing methods. The server 1 may include modules corresponding to corresponding steps.

Figure 12:
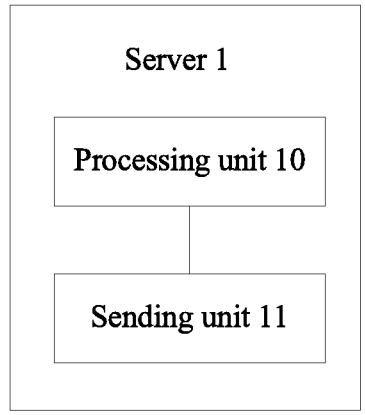
FIG. 12 is a first schematic structural diagram of a server according to an embodiment of the present invention.

As shown in FIG. 12, the server 1 provided in this embodiment of the present invention may include:

a processing unit 10, configured to obtain a first group identifier, where the first group identifier is determined based on location information of first user equipment, and configured to obtain group communication data sent by the first user equipment; and a sending unit 11, configured to send the group communication data in a cell corresponding to the first group identifier based on the first group identifier obtained by the processing unit 10.

Figure 13:
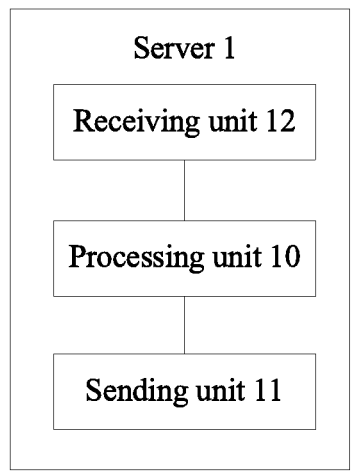
FIG. 13 is a second schematic structural diagram of a server according to an embodiment of the present invention.

Further, as shown in the embodiment illustrated in FIG. 13, if the server 1 is an application server, the server 1 further includes a receiving unit 12.

The receiving unit 12 is configured to receive the location information sent by the first user equipment, or configured to receive the first group identifier sent by the first user equipment.

Further, if the server 1 is an application server, the processing unit 10 is configured to obtain, based on the location information received by the receiving unit 12, the first group identifier corresponding to the location information from a preset correspondence, where the first preset correspondence stores a correspondence between the location information and the first group identifier.

Further, if the server 1 is an application server, the sending unit 11 is configured to send the group communication data to a broadcast server in a first broadcast session, so that the broadcast server sends the group communication data in the cell. The first broadcast session is a broadcast session, corresponding to the first group identifier, established between the application server and the broadcast server.

Further, if the server 1 is a broadcast server, the receiving unit 12 is configured to receive the first group identifier sent by an application server, or configured to receive the first group identifier sent by a base station, where the base station is a serving base station of the first user equipment.

Further, if the server 1 is a broadcast server, the receiving unit 12 is configured to receive a service identifier sent by the application server, where the service identifier is used to indicate a service type of the group communication data.

It may be understood that the server 1 in this embodiment may be corresponding to the application server or the broadcast server in the group communication method in the embodiment in any one of FIG. 6 to FIG. 9. In addition, division and/or functions of modules in the server 1 in this embodiment are intended to implement the method procedure shown in any one of FIG. 6 to FIG. 9. For brevity, details are not described herein.

This embodiment of the present invention provides the server. The server first obtains the first group identifier determined based on the location information of the first user equipment, and obtains the group communication data sent by the first user equipment. Then, the server sends the group communication data in the cell corresponding to the first group identifier based on the first group identifier. Because the first group identifier is determined based on the location information of the first user equipment, the group communication method provided in the present invention can be used to accurately identify a cell range in which the group communication data sent by the first user equipment is to be broadcast, and to improve utilization of a downlink transmission resource.

Figure 14:
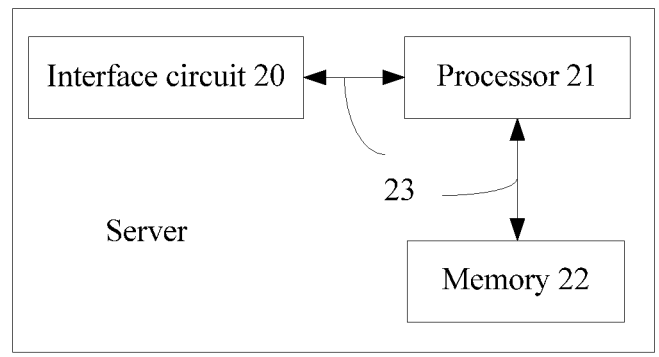
FIG. 14 is a third schematic structural diagram of a server according to an embodiment of the present invention.

Another embodiment of the present invention provides a server. As shown in FIG. 14, the server includes an interface circuit 20, a processor 21, a memory 22, and a system bus 23.

The interface circuit 20, the processor 21, and the memory 22 are separately connected by using the system bus 23 and complete mutual communication.

A person skilled in the art may understand that the embodiment of a structure of the server shown in FIG. 14 does not constitute a limitation on the server. The server may include more or fewer components than those shown in the figure, or combine some components, or have different component arrangements.

When the server runs, the server performs the group communication method described in the foregoing embodiment. For a specific group communication method, refer to related description in the embodiment shown in any one of FIG. 6 to FIG. 11A and FIG. 11B. Details are not described herein again.

The interface circuit 20 is configured to implement a communicative connection between the server and another communications device.

The memory 22 may be configured to store a software program and an application module. By running the software program and the application module that are stored in the memory 22, the processor 21 executes various functional applications and data processing of the server. The memory 22 may mainly include a program storage area and a data storage area. The program storage area may store an operating system, an application program required by at least one function (for example, sending group communication data), and the like. The data storage area may store a first group identifier.

The memory 22 may include a volatile memory, such as a high-speed random access memory (RAM). The memory 22 may also include a non-volatile memory, such as at least one magnetic disk storage component, a flash memory component, or another volatile solid-state storage component.

The processor 21 is a control center of the server, and uses various interfaces and lines to connect all parts of the entire server. By running or executing the software program and/or the application module that are/is stored in the memory 22 and invoking data stored in the memory 22, the processor 21 performs various functions and data processing of the server, so as to perform overall monitoring on the server.

The processor 21 may be a central processing unit (CPU), or may be another general-purpose processor, a digital signal processor (DSP), another programmable logic device, a transistor logic device, a discrete hardware component, or the like. The general-purpose processor may be a microprocessor, or the processor may be any conventional processor or the like.

The system bus 23 may include a data bus, a power bus, a control bus, a signal status bus, and the like. In this embodiment, for clear description, various buses are represented by the system bus 23 in FIG. 14.

This embodiment of the present invention provides a server. The server first obtains a first group identifier determined based on location information of first user equipment, and obtains group communication data sent by the first user equipment. Then, the server sends the group communication data in a cell corresponding to the first group identifier based on the first group identifier. Because the first group identifier is determined based on the location information of the first user equipment, the group communication method provided in the present invention can be used to accurately identify a cell range in which the group communication data sent by the first user equipment is to be broadcast, and to improve utilization of a downlink transmission resource.

Another embodiment of the present invention provides user equipment 1. The user equipment 1 is configured to perform the steps performed by the first user equipment in the foregoing methods. The user equipment 1 may include modules corresponding to corresponding steps.

Figure 15:
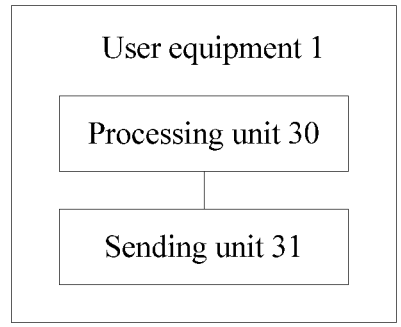
FIG. 15 is a first schematic structural diagram of user equipment according to an embodiment of the present invention.

As shown in FIG. 15, the user equipment 1 provided in this embodiment of the present invention may include:
a processing unit 30, configured to obtain first information, where the first information is area information of the user equipment or a first group identifier, and the first information is determined based on location information of the first user equipment; and
a sending unit 31, configured to send the first information obtained by the processing unit 30.

Figure 16:
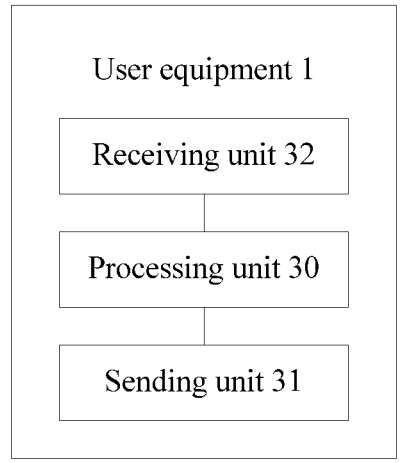
FIG. 16 is a second schematic structural diagram of user equipment according to an embodiment of the present invention.

Further, as shown in FIG. 16, if the first information is the first group identifier, the user equipment 1 further includes a receiving unit 32.

The receiving unit 32 is configured to receive the first group identifier sent by a base station, where the base station is a serving base station of the user equipment 1, or is configured to receive a preset correspondence sent by the base station.

Further, the processing unit 30 is further configured to obtain the location information of the user equipment, and obtain, based on the location information, the first group identifier corresponding to the location information from the preset correspondence received by the receiving unit 32, where the preset correspondence stores a correspondence between the location information and the first group identifier.

Further, the sending unit 31 is configured to send the first group identifier to an application server.

Further, if the first information is the area information of the user equipment, the receiving unit 32 is configured to receive at least one piece of area information sent by a base station. The base station is a serving base station of the user equipment, and the at least one piece of area information includes an area covered by the base station.

Further, the processing unit 30 is further configured to obtain geographical location information of the user equipment, and use, based on the geographical location information, area information to which the geographical location information belongs in the at least one piece of area information received by the receiving unit 32, as the area information of the user equipment.

Further, the sending unit 31 is configured to send the area information of the user equipment to the base station.

Further, the receiving unit 32 is further configured to receive configuration information sent by the base station, where the configuration information is used to indicate a rule used by the user equipment to send the area information of the user equipment to the base station.

In embodiments, the sending units discussed herein may include hardware such as wireless transmitters, and the receiving units may also include hardware such as wireless receivers. However, other sending units and receiving units may be used consistent with the discussion herein.

It may be understood that the user equipment 1 in this embodiment may be corresponding to the first user equipment in the group communication method in the embodiment in any one of FIG. 6 to FIG. 9. In addition, division and/or functions of modules in the user equipment 1 in this embodiment are intended to implement the method procedure shown in any one of FIG. 6 to FIG. 9. For brevity, details are not described herein.

This embodiment of the present invention provides the user equipment. After obtaining the area information of the user equipment or the first group identifier determined based on the location information of the user equipment, the user equipment sends the area information of the user equipment or the first group identifier determined based on the location information of the user equipment, so that another communications device in a group communication network system determines the first group identifier based on the area information of the user equipment, or another communications device in a group communication network system directly receives the first group identifier sent by the user equipment, so that the another communications device sends group communication data in a cell corresponding to the first group identifier. Because the first group identifier is determined based on the location information of the first user equipment, the group communication method provided in the present invention can be used to accurately identify a cell range in which the group communication data sent by the first user equipment is to be broadcast, and to improve utilization of a downlink transmission resource.

Figure 17:
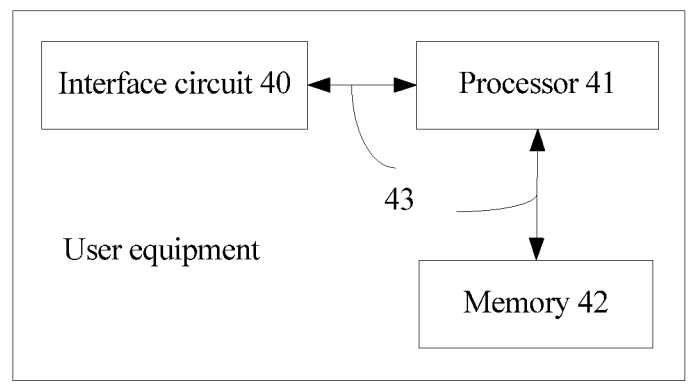
FIG. 17 is a third schematic structural diagram of user equipment according to an embodiment of the present invention.

Another embodiment of the present invention provides user equipment. As shown in FIG. 17, the user equipment includes an interface circuit 40, a processor 41, a memory 42, and a system bus 43.

The interface circuit 40, the processor 41, and the memory 42 are separately connected by using the system bus 43 and complete mutual communication.

A person skilled in the art may understand that a structure of the user equipment shown in FIG. 17 does not constitute a limitation on the server. The user equipment may include more or fewer components than those shown in the figure, or combine some components, or have different component arrangements.

When the user equipment runs, the user equipment performs the group communication method described in the foregoing embodiment. For a specific group communication method, refer to related description in the embodiment shown in any one of FIG. 6 to FIG. 9. Details are not described herein again.

The interface circuit 40 is configured to implement a communicative connection between the user equipment and another communications device.

The memory 42 may be configured to store a software program and an application module. By running the software program and the application module that are stored in the memory 42, the processor 41 executes various functional applications and data processing of the user equipment. The memory 42 may mainly include a program storage area and a data storage area. The program storage area may store an operating system, an application program required by at least one function (for example, sending group communication data), and the like. The data storage area may store location information of the user equipment.

The memory 42 may include a volatile memory, such as a RAM. The memory 42 may also include a non-volatile memory, such as at least one magnetic disk storage component, a flash memory component, or another volatile solid-state storage component.

The processor 41 is a control center of the user equipment, and uses various interfaces and lines to connect all parts of the entire user equipment. By running or executing the software program and/or the application module that are/is stored in the memory 42 and invoking data stored in the memory 42, the processor 41 performs various functions and data processing of the user equipment, so as to perform overall monitoring on the user equipment.

The processor 41 may be a CPU, another general-purpose processor, a DSP, another programmable logic device, a transistor logic device, a discrete hardware component, or the like. The general-purpose processor may be a microprocessor, or the processor may be any conventional processor or the like.

The system bus 43 may include a data bus, a power bus, a control bus, a signal status bus, and the like. In this embodiment, for clear description, various buses are represented by the system bus 43 in FIG. 17.

This embodiment of the present invention provides user equipment. After obtaining area information of the user equipment or a first group identifier determined based on location information of the user equipment, the user equipment sends the area information of the user equipment or the first group identifier determined based on the location information of the user equipment, so that another communications device in a group communication network system determines the first group identifier based on the area information of the user equipment, or another communications device in a group communication network system directly receives the first group identifier sent by the user equipment, so that the another communications device sends group communication data in a cell corresponding to the first group identifier. Because the first group identifier is determined based on the location information of the first user equipment, the group communication method provided in the present invention can be used to accurately identify a cell range in which the group communication data sent by the first user equipment is to be broadcast, and to improve utilization of a downlink transmission resource.

Another embodiment of the present invention provides a base station 1. The base station 1 is configured to perform the steps performed by the base station in the foregoing methods. The base station 1 may include modules corresponding to corresponding steps.

Figure 18:
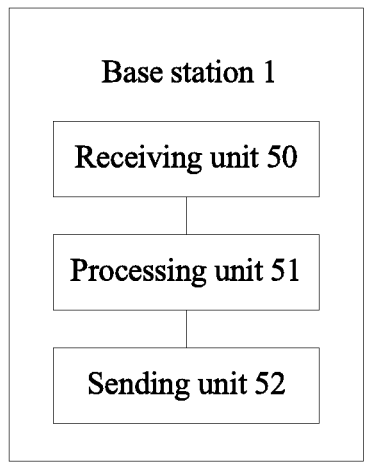
FIG. 18 is a first schematic structural diagram of a base station according to an embodiment of the present invention.

As shown in FIG. 18, the base station 1 provided in this embodiment of the present invention may include:
- a receiving unit 50, configured to receive location information sent by first user equipment;
- a processing unit 51, configured to determine a first group identifier based on the location information received by the receiving unit 50; and
- a sending unit 52, configured to send the first group identifier obtained by the processing unit 51.

Further, the sending unit 52 is configured to send the first group identifier to the first user equipment, or configured to send group identifier information to a broadcast server. The group identifier information includes the first group identifier and an identifier of the first user equipment.

Further, the group identifier information further includes a service identifier, and the service identifier is used to indicate a service type of group communication data sent by the first user equipment.

Further, if the location information is area information of the first user equipment, the sending unit 52 is further configured to send configuration information to the first user equipment before the receiving unit 50 receives the location information sent by the first user equipment. The configuration information is used to indicate a rule used by the first user equipment to send the area information of the first user equipment to the base station 1.

It may be understood that the base station 1 in this embodiment may be corresponding to the base station in the group communication method in the embodiment in any one of FIG. 6 to FIG. 9. In addition, division and/or functions of modules in the base station 1 in this embodiment are intended to implement the method procedure shown in any one of FIG. 6 to FIG. 9. For brevity, details are not described herein.

This embodiment of the present invention provides the base station. After receiving the location information sent by the first user equipment, the base station determines, based on the location information, the first group identifier corresponding to the location information from a preset correspondence, so that a server sends group communication data in a cell corresponding to the first group identifier. Because the first group identifier is determined based on the location information of the first user equipment, the group communication method provided in the present invention can be used to accurately identify a cell range in which the group communication data sent by the first user equipment is to be broadcast, and to improve utilization of a downlink transmission resource.

Figure 19:
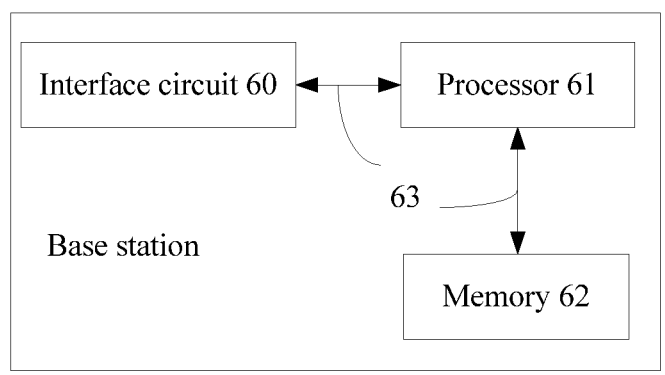
FIG. 19 is a second schematic structural diagram of a base station according to an embodiment of the present invention.

Another embodiment of the present invention provides a base station. As shown in FIG. 19, the base station includes an interface circuit 60, a processor 61, a memory 62, and a system bus 63.

The interface circuit 60, the processor 61, and the memory 62 are separately connected by using the system bus 63 and complete mutual communication.

A person skilled in the art may understand that a structure of the base station shown in FIG. 19 does not constitute a limitation on the server. The base station may include more or fewer components than those shown in the figure, or combine some components, or have different component arrangements.

When the base station runs, the base station performs the group communication method described in the foregoing embodiment. For a specific group communication method, refer to related description in the embodiment shown in any one of FIG. 6 to FIG. 11A and FIG. 11B. Details are not described herein again.

The interface circuit 60 is configured to implement a communicative connection between the base station and another communications device.

The memory 62 may be configured to store a software program and an application module. By running the software program and the application module that are stored in the memory 62, the processor 61 executes various functional applications and data processing of the base station. The memory 62 may mainly include a program storage area and a data storage area. The program storage area may store an operating system, an application program required by at least one function (for example, sending group communication data), and the like. The data storage area may store a preset correspondence.

The memory 62 may include a volatile memory, such as a RAM. The memory 62 may also include a non-volatile memory, such as at least one magnetic disk storage component, a flash memory component, or another volatile solid-state storage component.

The processor 61 is a control center of the base station, and uses various interfaces and lines to connect all parts of the entire base station. By running or executing the software program and/or the application module that are/is stored in the memory 62 and invoking data stored in the memory 62, the processor 61 performs various functions and data processing of the base station, so as to perform overall monitoring on the base station.

The processor 61 may be a CPU, another general-purpose processor, a DSP, another programmable logic device, a transistor logic device, a discrete hardware component, or the like. The general-purpose processor may be a microprocessor, or the processor may be any conventional processor or the like.

The system bus 63 may include a data bus, a power bus, a control bus, a signal status bus, and the like. In this embodiment, for clear description, various buses are represented by the system bus 63 in FIG. 19.

This embodiment of the present invention provides a base station. After receiving location information sent by first user equipment, the base station determines, based on the location information, a first group identifier corresponding to the location information from a preset correspondence, so that a server sends group communication data in a cell corresponding to the first group identifier. Because the first group identifier is determined based on the location information of the first user equipment, the group communication method provided in the present invention can be used to accurately identify a cell range in which the group communication data sent by the first user equipment is to be broadcast, and to improve utilization of a downlink transmission resource.

An embodiment of the present invention provides an application server 1. The application server 1 is configured to perform the steps performed by the application server in the foregoing method. The application server 1 may include modules corresponding to corresponding steps.

Figure 20:
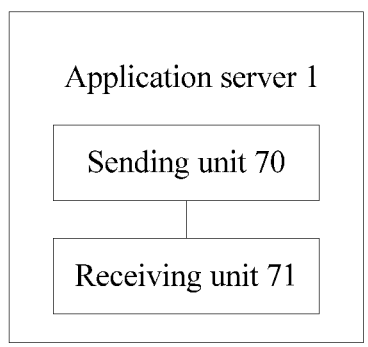
FIG. 20 is a first schematic structural diagram of an application server according to an embodiment of the present invention.

As shown in FIG. 20, the application server 1 provided in this embodiment of the present invention may include:

a sending unit 70, configured to send a group identifier request message to a broadcast server, where the group identifier request message carries a service identifier, and the service identifier is used to indicate a service type of group communication data; and a receiving unit 71, further configured to receive a group identifier response message sent by the broadcast server, where the group identifier response message carries at least one group identifier corresponding to the service identifier and at least one cell identity corresponding to each group identifier.

Figure 21:
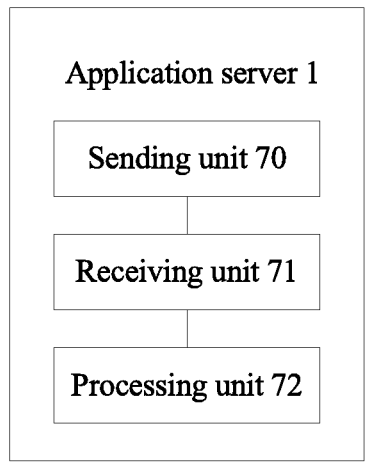
FIG. 21 is a second schematic structural diagram of an application server according to an embodiment of the present invention.

Further, as shown in the embodiment illustrated in FIG. 21, the application server 1 further includes a processing unit 72.

The processing unit 72 is configured to obtain group communication data sent by first user equipment and a cell identity of a first cell to which the first user equipment belongs, and determine, based on the cell identity of the first cell, a first group identifier corresponding to the cell identity of the first cell from the at least one group identifier received by the receiving unit 71.

Further, if the group identifier response message further carries broadcast session configuration corresponding to the first group identifier, the sending unit 70 is further configured to send the group communication data to the broadcast server in a first broadcast session. The first broadcast session is a broadcast session, corresponding to the first group identifier, established between the application server and the broadcast server.

It may be understood that the application server 1 in this embodiment may be corresponding to the application server in the group communication method in the embodiment in FIG. 10 or FIG. 11A and FIG. 11B. In addition, division and/or functions of modules in the application server 1 in this embodiment are intended to implement the method procedure shown in FIG. 10 or FIG. 11A and FIG. 11B. For brevity, details are not described herein.

Another embodiment of the present invention provides an application server. As shown in the embodiment illustrated in FIG. 22, the application server includes an interface circuit 80, a processor 81, a memory 82, and a system bus 83.

The interface circuit 80, the processor 81, and the memory 82 are separately connected by using the system bus 83 and complete mutual communication.

Figure 22:
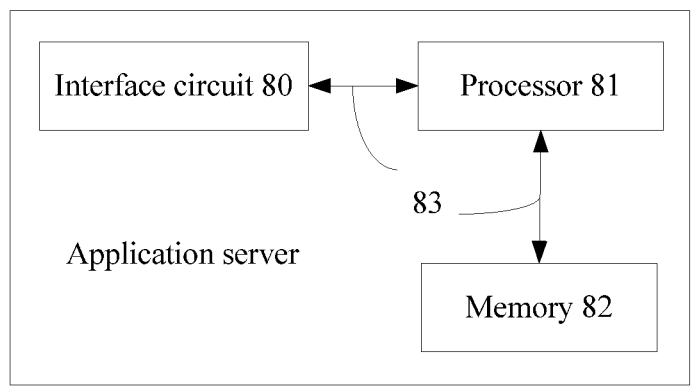
FIG. 22 is a third schematic structural diagram of an application server according to an embodiment of the present invention.

A person skilled in the art may understand that a structure of the application server shown in FIG. 22 does not constitute a limitation on the server. The server may include more or fewer components than those shown in the figure, or combine some components, or have different component arrangements.

When the application server runs, the application server performs the group communication method described in the foregoing embodiment. For a specific group communication method, refer to related description in the embodiment shown in FIG. 10 or FIG. 11A and FIG. 11B. Details are not described herein again.

The interface circuit 80 is configured to implement a communicative connection between the application server and another communications device.

The memory 82 may be configured to store a software program and an application module. By running the software program and the application module that are stored in the memory 82, the processor 81 executes various functional applications and data processing of the application server. The memory 82 may mainly include a program storage area and a data storage area. The program storage area may store an operating system, an application program required by at least one function (for example, sending an identifier request message), and the like. The data storage area may store at least one cell identity.

The memory 82 may include a volatile memory, such as a RAM. The memory 82 may also include a non-volatile memory, such as at least one magnetic disk storage component, a flash memory component, or another volatile solid-state storage component.

The processor 81 is a control center of the application server, and uses various interfaces and lines to connect all parts of the entire application server. By running or executing the software program and/or the application module that are/is stored in the memory 82 and invoking data stored in the memory 82, the processor 81 performs various functions and data processing of the application server, so as to perform overall monitoring on the application server.

The processor 81 may be a CPU, another general-purpose processor, a DSP, another programmable logic device, a transistor logic device, a discrete hardware component, or the like. The general-purpose processor may be a microprocessor, or the processor may be any conventional processor or the like.

The system bus 83 may include a data bus, a power bus, a control bus, a signal status bus, and the like. In this embodiment, for clear description, various buses are represented by the system bus 83 in FIG. 22.

An embodiment of the present invention provides a broadcast server 1. The broadcast server 1 is configured to perform the steps performed by the broadcast server in the foregoing method. The broadcast server 1 may include modules corresponding to corresponding steps.

Figure 23:
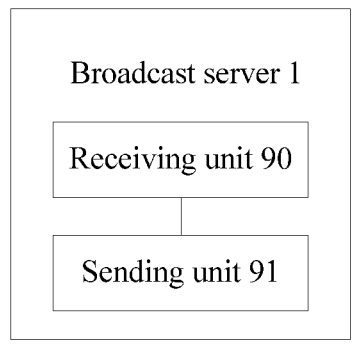
FIG. 23 is a first schematic structural diagram of a broadcast server according to an embodiment of the present invention.

As shown in FIG. 23, the broadcast server 1 provided in this embodiment of the present invention may include:

a receiving unit 90, further configured to receive a group identifier request message sent by an application server, where the group identifier request message carries a service identifier, and the service identifier is used to indicate a service type of group communication data; and a sending unit 91, configured to send a group identifier response message to the application server according to the service identifier received by the receiving unit 90, where the group identifier response message carries at least one group identifier corresponding to the service identifier and at least one cell identity corresponding to each group identifier.

Further, if the group identifier response message further carries broadcast session configuration corresponding to the first group identifier, the receiving unit 90 is configured to receive, in a first broadcast session, group communication data sent by the application server. The first broadcast session is a broadcast session, corresponding to the first group identifier, established between the application server and the broadcast server.

Further, the sending unit 91 is further configured to send a bearer request message and the group communication data to a base station. The bearer request message carries the first group identifier and the service identifier, and the base station is a base station that serves a cell corresponding to the first group identifier.

It may be understood that the broadcast server 1 in this embodiment may be corresponding to the broadcast server in the group communication method in the embodiment in FIG. 10 or FIG. 11A and FIG. 11B. In addition, division and/or functions of modules in the broadcast server 1 in this embodiment are intended to implement the method procedure shown in FIG. 10 or FIG. 11A and FIG. 11B. For brevity, details are not described herein.

Another embodiment of the present invention provides a broadcast server. As shown in the embodiment illustrated in FIG. 24, the broadcast server includes an interface circuit 100, a processor 101, a memory 102, and a system bus 103.

The interface circuit 100, the processor 101, and the memory 102 are separately connected by using the system bus 103 and complete mutual communication.

Figure 24:
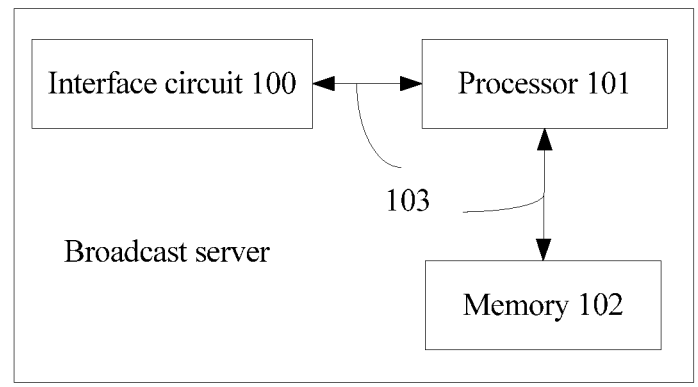
FIG. 24 is a second schematic structural diagram of a broadcast server according to an embodiment of the present invention.

A person skilled in the art may understand that a structure of the broadcast server shown in FIG. 24 does not constitute a limitation on the server. The server may include more or fewer components than those shown in the figure, or combine some components, or have different component arrangements.

When the broadcast server runs, the broadcast server performs the group communication method described in the foregoing embodiment. For a specific group communication method, refer to related description in the embodiment shown in FIG. 10 or FIG. 11A and FIG. 11B. Details are not described herein again.

The interface circuit 100 is configured to implement a communicative connection between the broadcast server and another communications device.

The memory 102 may be configured to store a software program and an application module. By running the software program and the application module that are stored in the memory 102, the processor 101 executes various functional applications and data processing of the broadcast server. The memory 102 may mainly include a program storage area and a data storage area. The program storage area may store an operating system, an application program required by at least one function (for example, sending an identifier response message), and the like. The data storage area may store at least one cell identity.

The memory 102 may include a volatile memory, such as a RAM. The memory 102 may also include a non-volatile memory, such as at least one magnetic disk storage component, a flash memory component, or another volatile solid-state storage component.

The processor 101 is a control center of the broadcast server, and uses various interfaces and lines to connect all parts of the entire broadcast server. By running or executing the software program and/or the application module that are/is stored in the memory 102 and invoking data stored in the memory 102, the processor 101 performs various functions and data processing of the broadcast server, so as to perform overall monitoring on the broadcast server.

The processor 101 may be a CPU, another general-purpose processor, a DSP, another programmable logic device, a transistor logic device, a discrete hardware component, or the like. The general-purpose processor may be a microprocessor, or the processor may be any conventional processor or the like.

The system bus 103 may include a data bus, a power bus, a control bus, a signal status bus, and the like. For clarity of description in this embodiment, various buses are marked as the system bus 103 in FIG. 24.

An embodiment of the present invention provides a base station 2. The base station 2 is configured to perform the steps performed by the base station in the foregoing method. The base station 2 may include modules corresponding to corresponding steps.

Figure 25:
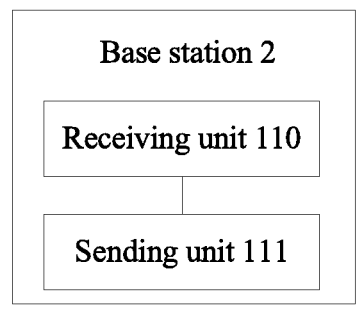
FIG. 25 is a first schematic structural diagram of a base station according to another embodiment of the present invention.

As shown in FIG. 25, the base station 2 provided in this embodiment of the present invention may include:
  a receiving unit 110, configured to receive a bearer request message sent by a broadcast server, where the bearer request message carries a first group identifier and a service identifier, and the service identifier is corresponding to the first group identifier; and
  a sending unit 111, configured to send the first group identifier and the service identifier to user equipment served by the base station.

Further, the receiving unit 110 is further configured to receive group communication data that is sent by the broadcast server and corresponding to both the service identifier and the first group identifier.

Further, the sending unit 111 is further configured to send the group communication data to the user equipment served by the base station.

It may be understood that the base station 2 in this embodiment may be corresponding to the base station in the group communication method in the embodiment in FIG. 10 or FIG. 11A and FIG. 11B. In addition, division and/or functions of modules in the base station 2 in this embodiment are intended to implement the method procedure shown in FIG. 10 or FIG. 11A and FIG. 11B. For brevity, details are not described herein.

Figure 26:
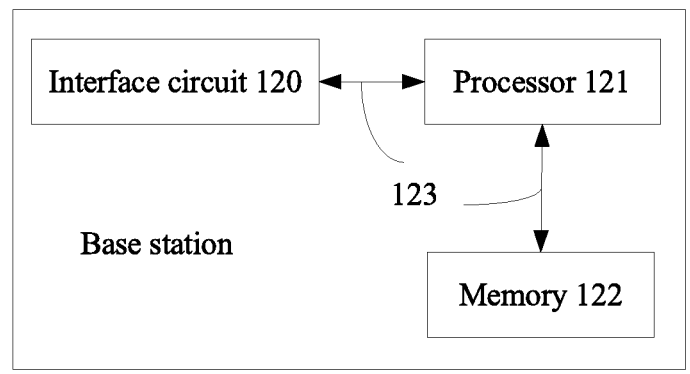
FIG. 26 is a second schematic structural diagram of a base station according to another embodiment of the present invention.

Another embodiment of the present invention provides a base station. As shown in FIG. 26, the base station includes an interface circuit 120, a processor 121, a memory 122, and a system bus 123.

The interface circuit 120, the processor 121, and the memory 122 are separately connected by using the system bus 123 and complete mutual communication.

A person skilled in the art may understand that a structure of the base station shown in the embodiment illustrated in FIG. 26 does not constitute a limitation on the server. The base station may include more or fewer components than those shown in the figure, or combine some components, or have different component arrangements.

When the base station runs, the base station performs the group communication method described in the foregoing embodiment. For a specific group communication method, refer to related description in the embodiment shown in FIG. 10 or FIG. 11A and FIG. 11B. Details are not described herein again.

The interface circuit 120 is configured to implement a communicative connection between the base station and another communications device.

The memory 122 may be configured to store a software program and an application module. By running the software program and the application module that are stored in the memory 122, the processor 121 executes various functional applications and data processing of the base station. The memory 122 may mainly include a program storage area and a data storage area. The program storage area may store an operating system, an application program required by at least one function (for example, sending a first group identifier), and the like. The data storage area may store a first group identifier.

The memory 122 may include a volatile memory, such as a RAM. The memory 122 may also include a non-volatile memory, such as at least one magnetic disk storage component, a flash memory component, or another volatile solid-state storage component.

The processor 121 is a control center of the base station, and uses various interfaces and lines to connect all parts of the entire base station. By running or executing the software program and/or the application module that are/is stored in the memory 122 and invoking data stored in the memory 122, the processor 121 performs various functions and data processing of the base station, so as to perform overall monitoring on the base station.

The processor 121 may be a CPU, another general-purpose processor, a DSP, another programmable logic device, a transistor logic device, a discrete hardware component, or the like. The general-purpose processor may be a microprocessor, or the processor may be any conventional processor or the like.

The system bus 123 may include a data bus, a power bus, a control bus, a signal status bus, and the like. For clarity of description in this embodiment, various buses are marked as the system bus 123 in FIG. 26.

Another embodiment of the present invention provides user equipment 2. The user equipment 2 is configured to perform the steps performed by the second user equipment in the foregoing method. The user equipment 2 may include modules corresponding to corresponding steps.

Figure 27:
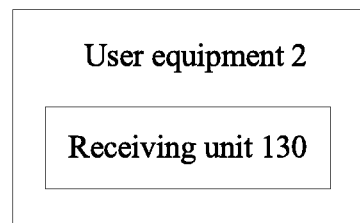
FIG. 27 is a first schematic structural diagram of user equipment according to another embodiment of the present invention.

As shown in FIG. 27, the user equipment 2 provided in this embodiment of the present invention may include:
  a receiving unit 130, configured to receive a first group identifier and a service identifier that are sent by a base station, where the service identifier is corresponding to the first group identifier.

Further, the receiving unit 130 is configured to: if the user equipment has obtained configuration corresponding to both the first group identifier and the service identifier, receive group communication data that is sent by the base station and corresponding to both the first group identifier and the service identifier.

Figure 28:
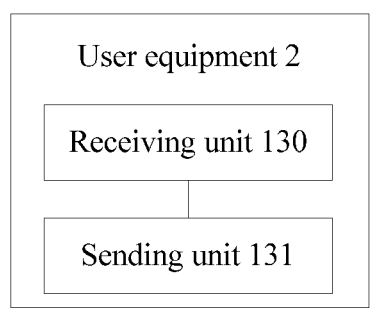
FIG. 28 is a second schematic structural diagram of user equipment according to another embodiment of the present invention.

Further, as shown in the embodiment illustrated in FIG. 28, the user equipment 2 further includes a sending unit 131.

The sending unit 131 is further configured to: if the user equipment 2 does not obtain the configuration corresponding to both the first group identifier and the service identifier, send a configuration request message to an application server corresponding to both the group identifier and the service identifier, so as to obtain the configuration corresponding to both the service identifier and the first group identifier. The configuration request message carries at least one of the first group identifier and the service identifier.

It may be understood that the user equipment 2 in this embodiment may be corresponding to the second user equipment in the group communication method in the embodiment in FIG. 10 or FIG. 11A and FIG. 11B. In addition, division and/or functions of modules in the user equipment 2 in this embodiment are intended to implement the method procedure shown in FIG. 10 or FIG. 11A and FIG. 11B. For brevity, details are not described herein.

Figure 29:
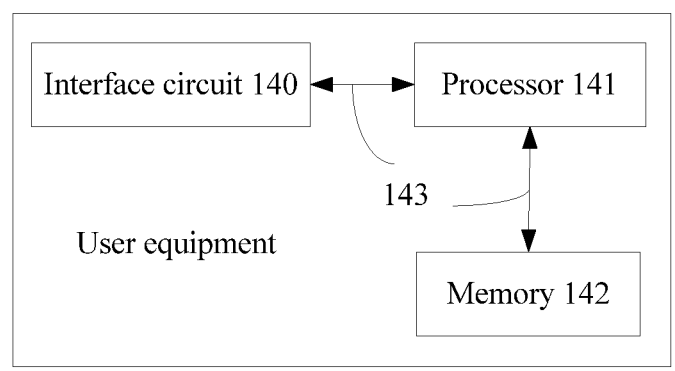
FIG. 29 is a third schematic structural diagram of user equipment according to another embodiment of the present invention.

Another embodiment of the present invention provides user equipment. As shown in FIG. 29, the user equipment includes an interface circuit 140, a processor 141, a memory 142, and a system bus 143.

The interface circuit 140, the processor 141, and the memory 142 are separately connected by using the system bus 143 and complete mutual communication.

A person skilled in the art may understand that a structure of the user equipment shown in FIG. 29 does not constitute a limitation on the server. The user equipment may include more or fewer components than those shown in the figure, or combine some components, or have different component arrangements.

When the user equipment runs, the user equipment performs the group communication method described in the foregoing embodiment. For a specific group communication method, refer to related description in the embodiment shown in FIG. 10 or FIG. 11A and FIG. 11B. Details are not described herein again.

The interface circuit 140 is configured to implement a communicative connection between the user equipment and another communications device.

The memory 142 may be configured to store a software program and an application module. By running the software program and the application module that are stored in the memory 142, the processor 141 executes various functional applications and data processing of the user equipment. The memory 142 may mainly include a program storage area and a data storage area. The program storage area may store an operating system, an application program required by at least one function, and the like. The data storage area may store group communication data.

The memory 142 may include a volatile memory, such as a RAM. The memory 142 may also include a non-volatile memory, such as at least one magnetic disk storage component, a flash memory component, or another volatile solid-state storage component.

The processor 141 is a control center of the user equipment, and uses various interfaces and lines to connect all parts of the entire user equipment. By running or executing the software program and/or the application module that are/is stored in the memory 142 and invoking data stored in the memory 142, the processor 141 performs various functions and data processing of the user equipment, so as to perform overall monitoring on the user equipment.

The processor 141 may be a CPU, another general-purpose processor, a DSP, another programmable logic device, a transistor logic device, a discrete hardware component, or the like. The general-purpose processor may be a microprocessor, or the processor may be any conventional processor or the like.

The system bus 143 may include a data bus, a power bus, a control bus, a signal status bus, and the like. For clarity of description in this embodiment, various buses are marked as the system bus 143 in FIG. 29.

Figure 30:
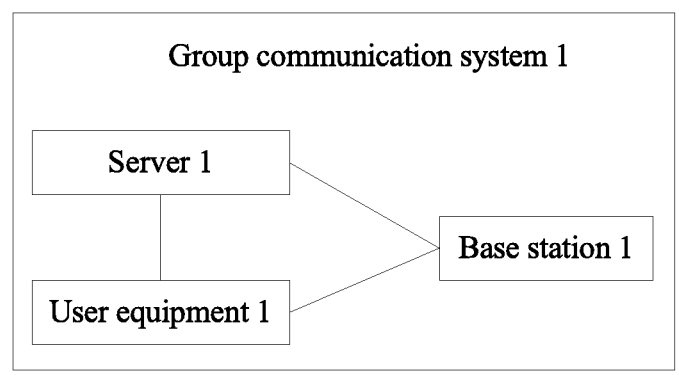
FIG. 30 is a first schematic structural diagram of a group communication system according to an embodiment of the present invention.

Another embodiment of the present invention provides a group communication system 1. As shown in the embodiment illustrated in FIG. 30, the group communication system 1 includes the server 1 described in the foregoing embodiment, the base station 1 described in the foregoing embodiment, and the user equipment 1 described in the foregoing embodiment. The server 1, the base station 1, and the user equipment 1 are connected by using a network.

Figure 31:
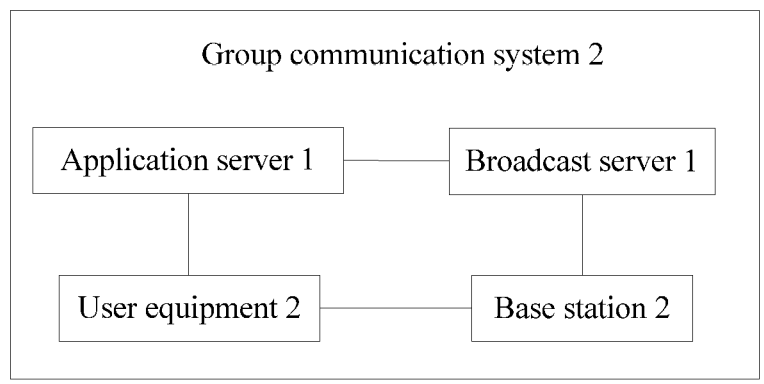
FIG. 31 is a second schematic structural diagram of a group communication system according to an embodiment of the present invention.

Another embodiment of the present invention provides a group communication system 2. As shown in the embodiment illustrated in FIG. 31, the group communication system 2 includes the application server 1 described in the foregoing embodiment, the broadcast server 1 described in the foregoing embodiment, the base station 2 described in the foregoing embodiment, and the user equipment 2 described in the foregoing embodiment. The application server 1, the broadcast server 1, the base station 2, and the user equipment 2 are connected by using a network.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of a mobile device is divided into different function modules to implement all or part of the functions described above. For a detailed working process of the foregoing system, mobile device, and unit, reference may be made to a corresponding process in the foregoing method embodiments, and details are not described herein again.

In the several embodiments provided in the present application, it should be understood that the disclosed system, mobile device, and method may be implemented in other manners. For example, the described mobile device embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the mobile devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) or a processor to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A group communication method, comprising:
    sending by user equipment to a base station, location information associated with the user equipment prior to establishing a vehicle-to-vehicle (V2V) or a vehicle-to-infrastructure (V2I) service type of group communication; and
    receiving, by user equipment, a first group identifier and a service identifier that are sent by the base station, wherein the first group identifier is selected for user equipment from among pre-establishment group identifiers for group communication based on a preset correspondence between the location information associated with the user equipment and the first group identifier, the service identifier indicates a vehicle-to-vehicle (V2V) or a vehicle-to-infrastructure (V2I) service type of group communication the user equipment is participating in, and wherein the service identifier corresponds to the first group identifier.

2. The group communication method according to claim 1, comprising:
    when the user equipment has obtained a configuration corresponding to both the first group identifier and the service identifier, receiving, by the user equipment, group communication data that is sent by the base station and corresponds to both the first group identifier and the service identifier; and
    when the user equipment does not obtain the configuration corresponding to both the group identifier and the service identifier, sending, by the user equipment, a configuration request message to an application server corresponding to both the first group identifier and the service identifier, to obtain the configuration corresponding to both the service identifier and the first group identifier, wherein the configuration request message carries at least one of the first group identifier and the service identifier.

3. A base station, comprising:
    a receiving unit, configured to receive a bearer request message sent by a broadcast server, wherein the bearer request message carries a first group identifier and a service identifier, wherein the first group identifier is selected for user equipment from among pre-establishment group identifiers for group communication based on a preset correspondence between location information associated with the user equipment and the first group identifier, the service identifier indicates a vehicle-to-vehicle (V2V) or a vehicle-to-infrastructure (V2I) service type of group communication the user equipment is participating in, and the service identifier corresponds to the first group identifier; and
    a sending unit, configured to send a first signaling to the user equipment served by the base station, wherein the first signaling carries the first group identifier and the service identifier.

4. The base station according to claim 3, wherein
    the receiving unit is further configured to receive group communication data that is sent by the broadcast server and corresponds to both the service identifier and the first group identifier; and
    the sending unit is further configured to send the group communication data to the user equipment served by the base station.

5. User equipment, comprising:
    a sending unit, configured to send, to a base station, location information associated with the user equipment prior to establishing a vehicle-to-vehicle (V2V) or a vehicle-to-infrastructure (V2I) service type of group communication;
    a receiving unit, configured to receive a first signaling sent by a base station, wherein the first signaling comprises a first group identifier and a service identifier, wherein the first group identifier is selected for the user equipment from among pre-established group identifiers for group communication based on a preset correspondence between the location information associated with the user equipment and the first group identifier, the service identifier indicates a vehicle-to-vehicle (V2V) or a vehicle-to-infrastructure (V2I) service type of group communication the user equipment is participating in, and the service identifier corresponds to the first group identifier.

6. The user equipment according to claim 5, wherein
    the receiving unit is configured to: when the user equipment has obtained a configuration corresponding to both the first group identifier and the service identifier, receive the group communication data sent by the base station and corresponding to both the first group identifier and the service identifier; and
    the sending unit is configured to: when the user equipment does not obtain the configuration corresponding to both the first group identifier and the service identifier that are received by the receiving unit, send a configuration request message to an application server corresponding to both the first group identifier and the service identifier, to obtain the configuration corresponding to both the service identifier and the first group identifier, wherein the configuration request message carries at least one of the first group identifier and the service identifier.

* * * * *

UNITED STATES PATENT AND TRADEMARK OFFICE
CERTIFICATE OF CORRECTION

Page 1 of 1

PATENT NO. : 10,785,639 B2
APPLICATION NO. : 16/147167
DATED : September 22, 2020
INVENTOR(S) : Yao Hua and Yan Wang It is certified that error appears in the above-identified patent and that said Letters Patent is hereby corrected as shown below:

In the Claims

In Claim 1, Column 43, Line 29, delete "selected for user" and insert --selected for the user--.

In Claim 1, Column 43, Line 30, delete "pre-establishment" and insert --pre-established--.

In Claim 3, Column 44, Line 2-3, delete "pre-establishment" and insert --pre-established--.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*